US00RE38243E

(19) United States
(12) Reissued Patent
Oe et al.

(10) Patent Number: US RE38,243 E
(45) Date of Reissued Patent: Sep. 2, 2003

(54) PLANE LIGHT SOURCE UNIT

(75) Inventors: Makoto Oe, Tama (JP); Ithussei Chiba, Kawasaki (JP)

(73) Assignee: Mitsubishi Rayon Co., Ltd., Tokyo (JP)

(21) Appl. No.: 08/887,112

(22) Filed: Jul. 2, 1997

Related U.S. Patent Documents

Reissue of:
(64) Patent No.: 5,126,882
Issued: Jun. 30, 1992
Appl. No.: 07/269,723
Filed: Nov. 10, 1988

U.S. Applications:
(63) Continuation of application No. 08/267,380, filed on Jun. 29, 1994, now Pat. No. Re. 35,704.

(30) Foreign Application Priority Data

Nov. 12, 1987 (JP) ..... 62-284289
Jun. 2, 1988 (JP) ..... 63-134393

(51) Int. Cl.[7] ..... G02B 27/00; G02F 1/1335
(52) U.S. Cl. ..... 359/619; 359/36; 359/40
(58) Field of Search ..... 359/619, 36, 40, 359/618, 636, 638

(56) References Cited

U.S. PATENT DOCUMENTS

| | | | | |
|---|---|---|---|---|
| 1,535,985 A | * | 4/1925 | Clark | |
| 2,175,067 A | | 10/1939 | Rolph | 240/106 |
| 2,248,638 A | | 7/1941 | Merton | 156/10 |
| 2,351,034 A | | 6/1944 | Gabor | 88/1 |
| 2,855,523 A | * | 10/1958 | Berger | 250/216 |
| 3,222,515 A | | 12/1965 | Orr | 240/106 |
| 3,740,119 A | * | 6/1973 | Sakurai et al. | 350/167 |
| 3,840,695 A | * | 10/1974 | Fischer | 358/61 |
| 3,972,593 A | | 8/1976 | Appeldorn et al. | 350/211 |

(List continued on next page.)

FOREIGN PATENT DOCUMENTS

| | | |
|---|---|---|
| EP | 0167721 | * 11/1985 |
| EP | 0 167 721 | 1/1986 |
| GB | 1133367 | 8/1966 |
| JP | 48-22680 | 7/1973 |
| JP | 53-57068 | 5/1978 |
| JP | 56-139101 | 3/1981 |
| JP | 56-111804 | 9/1981 |
| JP | 58-159317 | * 9/1983 |

OTHER PUBLICATIONS

IBM Technical Disclosure Bulletin, vol. 29, No. 11, Apr. 1987, pp. 4838–4839, New York, N.Y., "Backlighting for liquid crystal display".*

3M Scotch™ Optical Lighting Film Application Bulletin, Nov. 1998 (preliminary).

*Primary Examiner*—Hung Xuan Dang
(74) *Attorney, Agent, or Firm*—Morgan, Lewis & Bockius LLP

(57) ABSTRACT

A plane light source unit is provided which comprises a first element having a light incident face at least at one side end thereof and a first light emitting surface extending perpendicularly to the light incident face, the first element further having a reflecting layer provided on a surface thereof opposite to the first light emitting surface, and a second element having a light incident surface which receives the light emitted by the first element and a second light emitting surface through which light is emitted in a predetermined direction, the first light emitting surface and/or the opposite surface of the first element having a directive function to cause incident light through the light incident face to emit through the first light emitting surface in a direction oblique to the direction of the light, the second element having a large number of prism units formed on the light incident surface thereof. The plane light source unit is advantageously used as a backlighting means for a liquid crystal display device or the like.

58 Claims, 34 Drawing Sheets

U.S. PATENT DOCUMENTS 4,043,636 A * 8/1977 Eberhardt et al. ..... 350/160
4,064,433 A 12/1977 Korn ..... 362/330
4,126,383 A * 11/1978 Doriguzzi et al. ..... 350/338
4,154,219 A 5/1979 Gupta et al. ..... 126/270
4,242,723 A 12/1980 Fabbri et al. ..... 362/33
4,642,736 A 2/1987 Masuzawa et al. ..... 362/31
4,660,936 A 4/1987 Nosker ..... 350/339
4,686,519 A 8/1987 Yoshida et al. ..... 340/701
4,704,004 A 11/1987 Nosker ..... 350/345
4,714,983 A * 12/1987 Lang ..... 362/27
4,791,540 A 12/1988 Dreyer, Jr. et al. ..... 362/331
4,798,448 A * 1/1989 van Raalte ..... 350/345
4,906,070 A 3/1990 Cobb, Jr. ..... 350/286
4,958,911 A * 9/1990 Beiswenger et al. ..... 350/331
4,975,807 A 12/1990 Ohashi ..... 362/23
5,056,892 A 10/1991 Cobb, Jr. ..... 359/831

* cited by examiner (a)

(b)

(a)

Central Point ①

(b)

10mm Point ② from Lamp (a)

(b)

(a)

(b)

(a)

Sample-1 Haze 70.8 %

(b)

Sample-2 Haze 64.8%

(c)

Sample-3 Haze 40.8 %

(d)

Sample-4 Haze 28.8 %

(e)

(f)

(a)

(b)

Central Point ①

10mm Point ② from Lamp

10mm Point ③ from Lamp

Convex Cylindrical Lenticular Lens

Front Type

Reverse Type

Triangular Pole-Shaped Lenticular Lens

Front Type

Reverse Type

Concave Cylindrical Lenticular Lens

Front Type

Reverse Type

Polygonal Pole-Shaped Lenticular Lens

Front Type

Reverse Type

Anisotropic Lenticular Lens A

Anisotropic Lenticular Lens B (a)

(b)

Light Distribution
1st Element:
Convex Cylindrical
Lenticular Lens

Front Type

Reverse Type

Light Distribution
1st Element:
Triangular-Pole Shaped
Lenticular Lens

Front Type

Reverse Type

Light Distribution
1st Element:
Concave Cylindrical
Lenticular Lens

Front Type

Reverse Type

Light Distribution
1st Element:
Polygonal-Pole Shaped
Lenticular Lens

Front Type

Reverse Type

Light Distribution
1st Element:
Anisotropic
Lenticular Lens A

Light Distribution
1st Element:
Anisotropic
Lenticular Lens B (a)

Sample-1 Haze 70.8 % Maximum Luminance Value 1660 cd/m²

(b)

Sample-2 Haze 64.8 % Maximum Luminance Value 1450 cd/m²

(c)

Sample– 3 Haze 40.8 % Maximum Luminance Value 1300 cd/m²

(d)

Sample– 4 Haze 28.8 % Maximum Luminance Value 1340 cd/m²

(e)

(f)

$\theta_1 = \theta_2$ Haze 70.8% Maximum Luminance Value 1780 cd/m²

PLANE LIGHT SOURCE UNIT

Matter enclosed in heavy brackets [ ] appears in the original patent but forms no part of this reissue specification; matter printed in italics indicates the additions made by reissue.

*This is a continuation of application Ser. No. 08/267,380, filed on Jun. 29, 1994, now U.S. Reissue Pat. No. Re. 35,704.*

BACKGROUND OF THE INVENTION

1. Field of the Invention

This invention relates to a plane light source unit, and more particularly to a plane light source unit which is applied advantageously as a backlighting means for a liquid crystal display device or the like.

2. Description of the Prior Art

Conventionally, a backlighting means for a liquid crystal display device or the like generally has such a construction that a lamp is located at a focus of a reflector having a parabolic section while a milk-white diffusing plate is located above the lamp. Various inventions have been made to optimize the configuration of a reflector, to adjust the diffusion coefficient of a diffusing plate, and so on.

Special constructions have also been provided which employ such a combination of a linear lamp and a light guide, one side end of which is adjacent to the lamp, and the configuration of the light guide is simulated by approximation to a point source and worked into a curved surface so as to emit the light in a particular direction, or the thickness of the light guide is varied along the direction of light, or else a lenticular is used wherein the prism angle is varied in accordance with the distance from the lamp, or otherwise such configurations as described above are combined suitably. With approximation to a point source, a light path can be simulated in almost every case, and it is possible to change the configuration of a light guide in accordance with the distance in the light direction depending upon such simulation. Such proposals have been made in a large number of patents and utility model registrations. Such plane light sources are disclosed, for example, in U.S. Pat. Nos. 4,126,383, 4,043,636, 4,059,916, 4,373,282, 4,285,889, 4,252,416, 3,546,438, 4,642,736 and 4,648,690 and Japanese Patent Laid-Open No. 62-278505.

While almost all of plane light sources are designed to emit light as uniformly as possible in all directions, it may be sometimes desired to concentrate emitted light in a particular direction depending upon application of a plane light source.

For example, in the case of application to a liquid crystal color TV set for personal use having a comparatively small viewing angle, it is required to em it the light only in a particular direction and make the amount of emitted light as uniform as possible over an entire emitting surface. FIG. 1 shows general construction of a liquid crystal color TV set. Referring to FIG. 1, reference numeral 1 denotes a liquid crystal display, 2 a body of the liquid crystal color TV set, 3 a normal line to the liquid crystal display 1, and 4 an eye of an observer. With the arrangement of the type mentioned, the liquid crystal display 1 is tilted upwardly at an angle of about 45 degrees with respect to the body 2 and is normally observed by an observer in a direction at an angle of about 15 degrees with respect to the normal line 3. Accordingly, a backlighting means which presents a higher luminance within a particular angular range indicated by X than at any other angular position would be advantageous in that the amount of emitted light can be concentrated to the particular angular range. In particular, the luminance of such a plane light source will exhibit a maximum value in a desired direction, which may be several times greater than a luminance value of an alternative plane light source of the type which emits light uniformly in all directions. Accordingly, if the backlighting means is used in a display device which has a narrow viewing angle in a particular direction, the display device can present a high luminance with a small power consumption.

However, a point source is not used as the light source for a backlighting means of the liquid crystal color TV set shown in FIG. 4 or the like except very rare special cases where the display has a small area. A light source actually used is generally such a volume light source as a fluorescent lamp which cannot be regarded as a point source and is very low in coincidence of approximation to a point source. Accordingly, while such plane light sources as have been proposed in the prior art have accurate and complicated configurations and require a high production cost, it is difficult for them to achieve such desired characteristics as described above.

Besides, light emitted by such a volume light source as a fluorescent lamp is diffused light and non-directive. In a strict sense, it is very difficult to assure a desired directivity using a diffused light emitting source.

Further, in order to obtain a plane light source of small size, it is preferable to make its greatest thickness substantially equal to the diameter of a light source lamp. However, a plane light source device of the type wherein a reflector having a parabolic section is disposed below a lamp as described hereinabove has a thickness substantially equal to twice to four times the diameter of the lamp. Accordingly, the light source device just mentioned cannot meet the requirement of small size.

SUMMARY OF THE INVENTION

It is an object of the present invention to provide a plane light source unit which has a reduced thickness substantially equal to the diameter of a lamp so that it is suitable for backlighting for a display device such as a liquid crystal color TV set which is small in size with a small viewing angle.

It is another object of the present invention to provide a plane light source unit which can readily produce light concentrated in a direction to be observed by a user without increasing power consumption.

In order to attain the objects, according to the present invention, there is provided a plane light source unit which comprises a first element having alight incident face at least at one side end thereof and a first light emitting surface extending perpendicularly to the light incident face, the first element further having a reflecting layer provided on a surface thereof opposite to the first light emitting surface, and a second element having a light incident surface which receives the light emitted by the first element and a second light emitting surface through which light is emitted in a predetermined direction, the first light emitting surface and/or the opposite surface of the first element having a directive function to cause incident light through the light incident face to emit through the first light emitting surface in a direction oblique to the direction of the light, the second element having a large number of prism units formed on the light incident surface thereof.

The above and other objects, features and advantages of the present invention will become apparent from the following description and the appended claims, taken in conjunction with the accompanying drawings.

DETAILED DESCRIPTION OF THE INVENTION

Prior to description of the preferred embodiments of the present invention, a basic concept of a plane light source unit according to the present invention will be described.

Figure 2A:
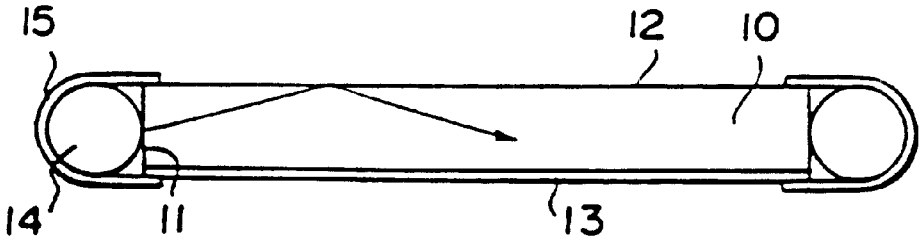
FIG. 2(a) PRIOR ART
FIGS. 2(a) and 2(b) are schematic sectional view of a conventional plane light source device.

The refractive index of a light guide with respect to air is generally n=1.5 to 1.6 or so, and in the case of such a configuration as shown in FIG. 2(a) wherein a light incident face 11 and a light emitting surface 12 of a light guide 10 extend in perpendicular directions to each other (i.e., edge lighting configuration), the critical angle is about 45 degrees at which no light is emitted through the surface 12 in principle. It is to be noted that, in FIG. 2(a), reference numeral 14 represents a light source such as a fluorescent lamp, 15 a reflector for the fluorescent lamp 15, and 13 a reflecting layer formed on the opposite side of the light guide 10 to the surface 12.

Figure 2B:
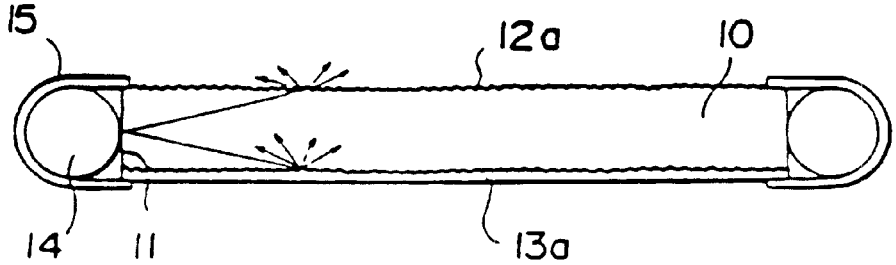
FIG. 2(b) PRIOR ART

Generally, either the surface 12 is formed into a light diffusing surface 12a or the reflecting layer 13 is formed into a light diffusing reflecting layer 13a as shown in FIG. 2(b). However, for the present object of directivity of emitted light, such means cannot be employed by itself because light emitted by the light guide 10 becomes diffused light.

Figure 3:
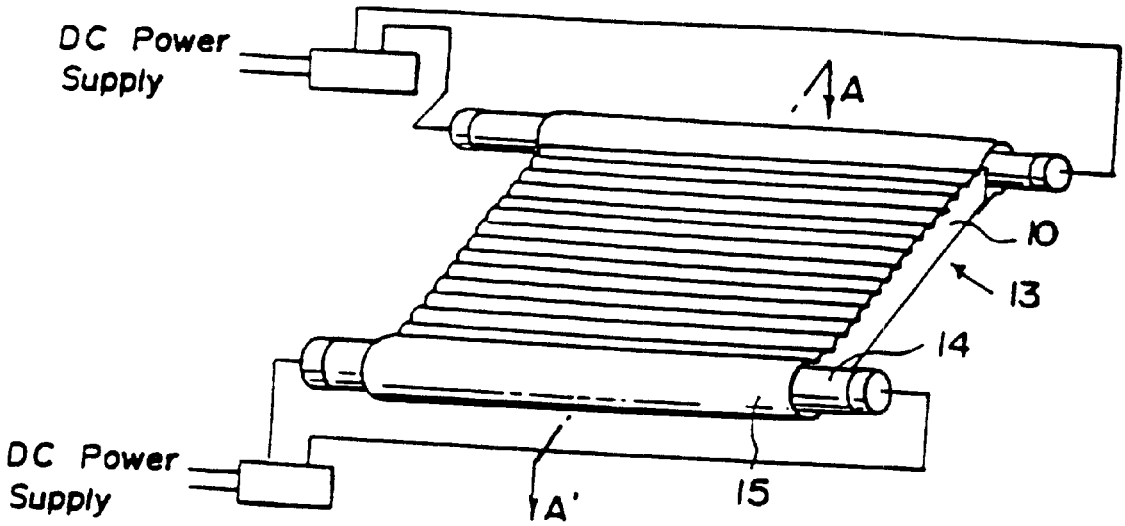
FIGS. 3(a) and 3(b) are a schematic perspective view and a schematic sectional view, respectively, showing a first element of a plane light source unit of the present invention together with lamp units.
Figure 3:
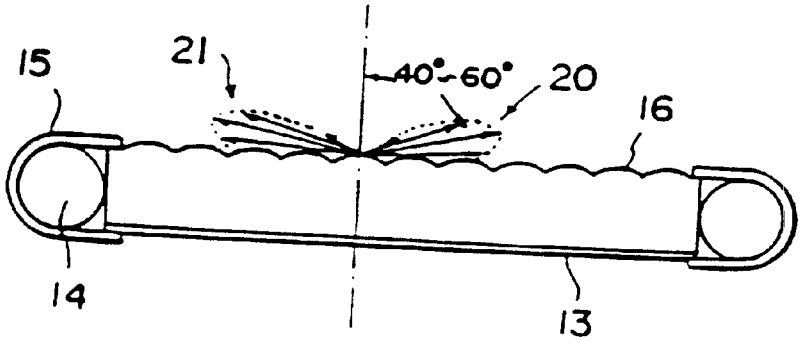

Thus, construction of a device is considered wherein a number of linear convex lenses 16 of a same profile are formed, on an emitting surface such that they extend in the same direction while a reflecting layer 13 is formed on a surface opposite to the emitting surface, and linear light sources 14 such as fluorescent lamps are arranged in parallel to the linear convex lenses 16 at opposite ends of the first element. FIG. 3(a) is a schematic perspective view showing such a construction described just above, and FIG. 3(b) is a schematic sectional view taken along line A–A' of FIG. 3(a).

With such a geometrical positional relationship, the direction of emitted light falls within an angular range of 40 to 60 degrees with respect to the normal line to the imaginary plane of the light emitting surface having convex lenses 16, and little light is emitted in the normal line direction (refer to FIG. 3(b)).

Figure 4:
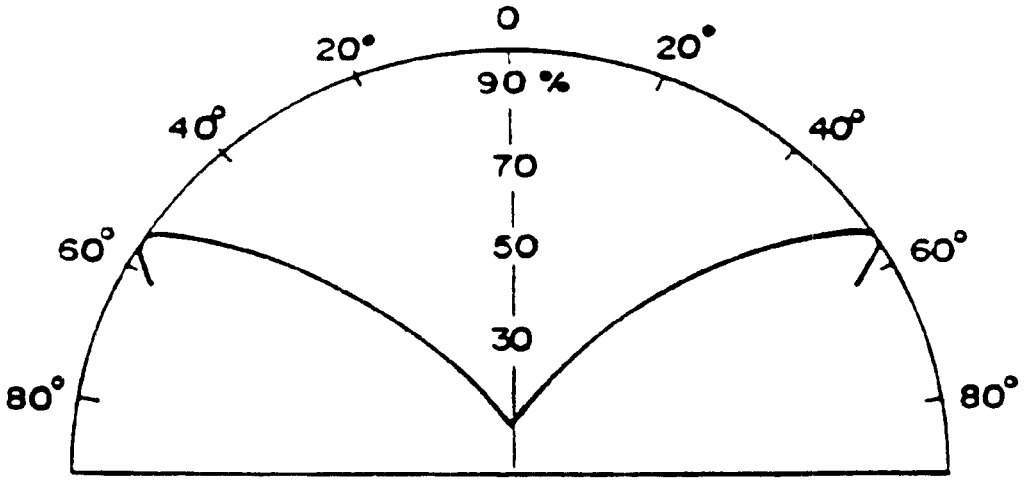
FIGS. 4(a) and 4(b) are diagrams showing angular distributions of light emitted by a first element of an example 1-1 of the present invention.
Figure 4:
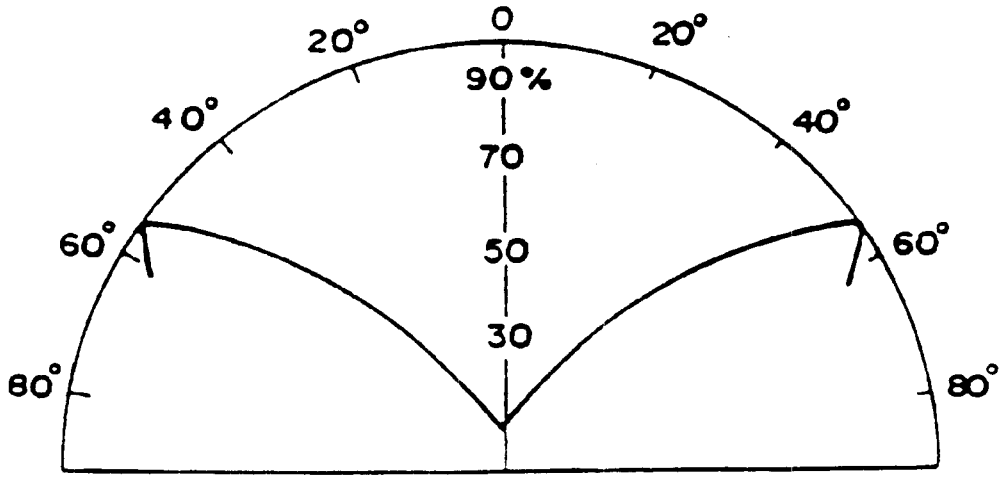

FIGS. 4(a) and 4(b) are diagrams illustrating angular distributions of light illustrated in FIG. 3(b) within a plane perpendicular to the direction of the convex lenses 16. In particular, the digrams show rates of luminance at various angles where the maximum luminance value is represented by 100 percent.

Figure 5:
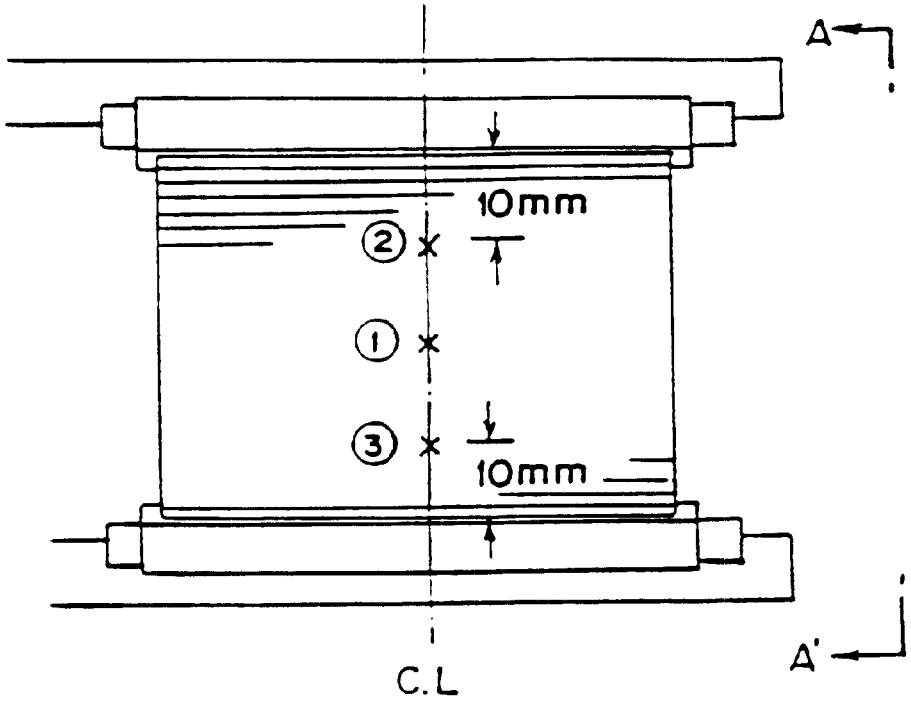
FIG. 5(a) is a schematic front elevational view illustrating a method of measuring angular distributions of light emitted by a plane light source unit of the present invention.
FIG. 5(b) is a diagrammatic representation as viewed in a direction indicated by arrow marks A–A' of FIG. 5(a)
Figure 5:
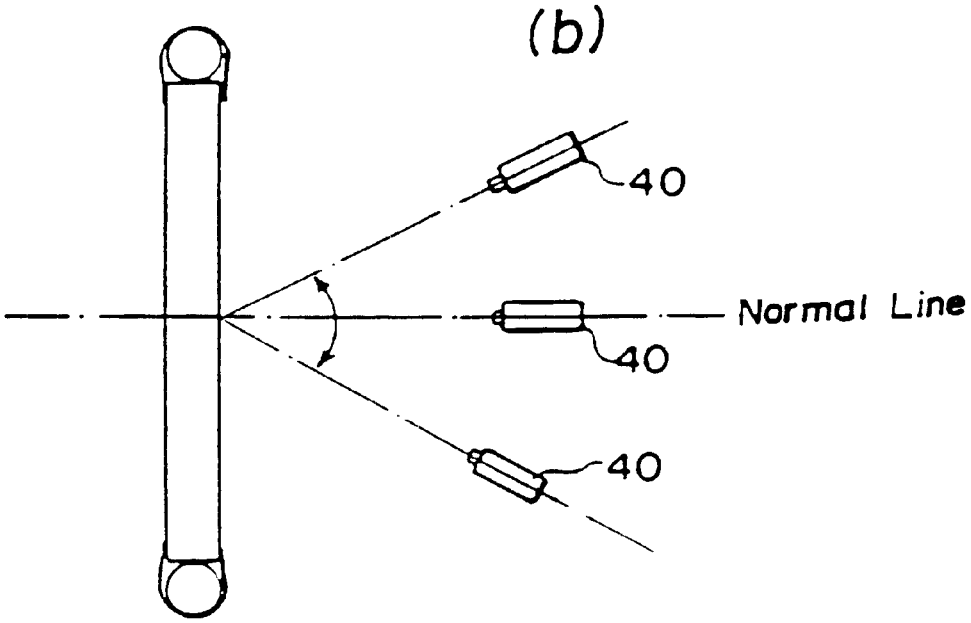

FIGS. 5(a) and 5(b) are diagrammatic representations illustrating a luminance measuring method, and FIG. 5(a) is a front elevational view of a plane light source unit together with lamps showing positions at which luminance is measured, and FIG. 5(b) is a diagrammatic representation as viewed in a direction indicated by arrows marks A–A' of FIG. 5(a). In FIG. 5(b), reference numeral represents a luminance meter.

FIG. 4(a) shows an angular distribution of light at the central point ① shown in FIG. 5(a) while FIG. 4(b) shows another angular distribution of light at another position ② spaced by a distance of 10 mm from the lamp. It can be seen also from the graphs that there is little light emitted in the normal line direction.

Thus, a plane light source unit of the present invention is constructed in its principle such that a number of lenses such as the lenses 16 are employed wherein light emitted through the lenses is concentrated in a particular direction so that the distribution of light falls within a narrow range and besides the amount of emitted light is large, and the light emitted toward the opposite sides of the normal line such as the lights 20, 21 illustrated in FIG. 3(b) are refracted by a set of prisms serving as a second element so as to concentrate the light in a desired direction.

Figure 6:
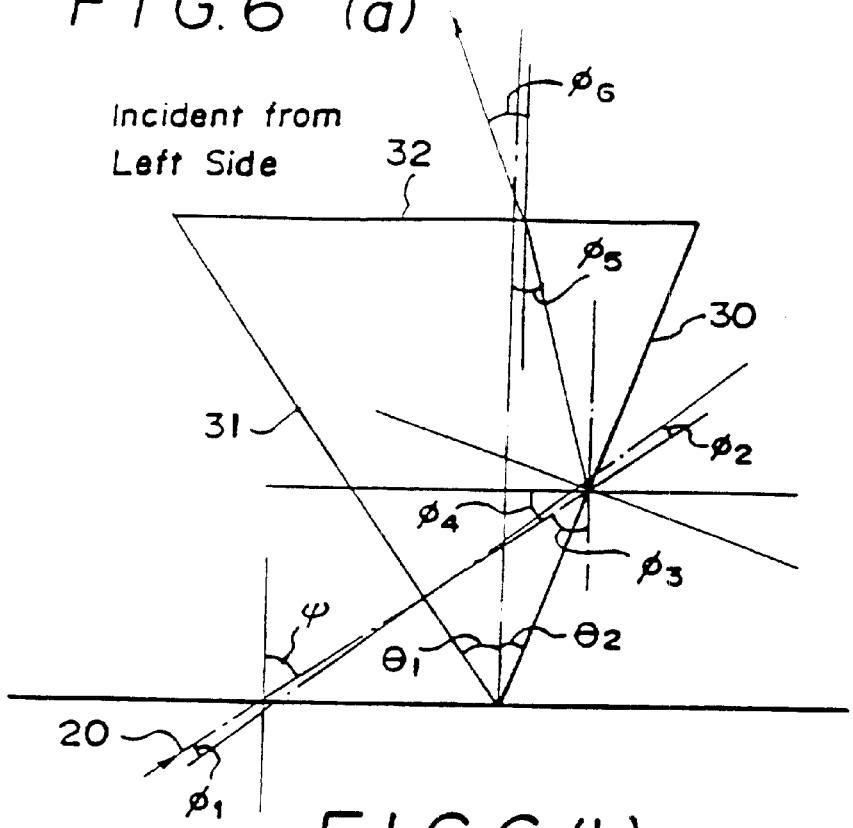
FIGS. 6(a) and 6(b) are diagrammatic representations illustrating paths of rays of light passing through a prism.
Figure 6:
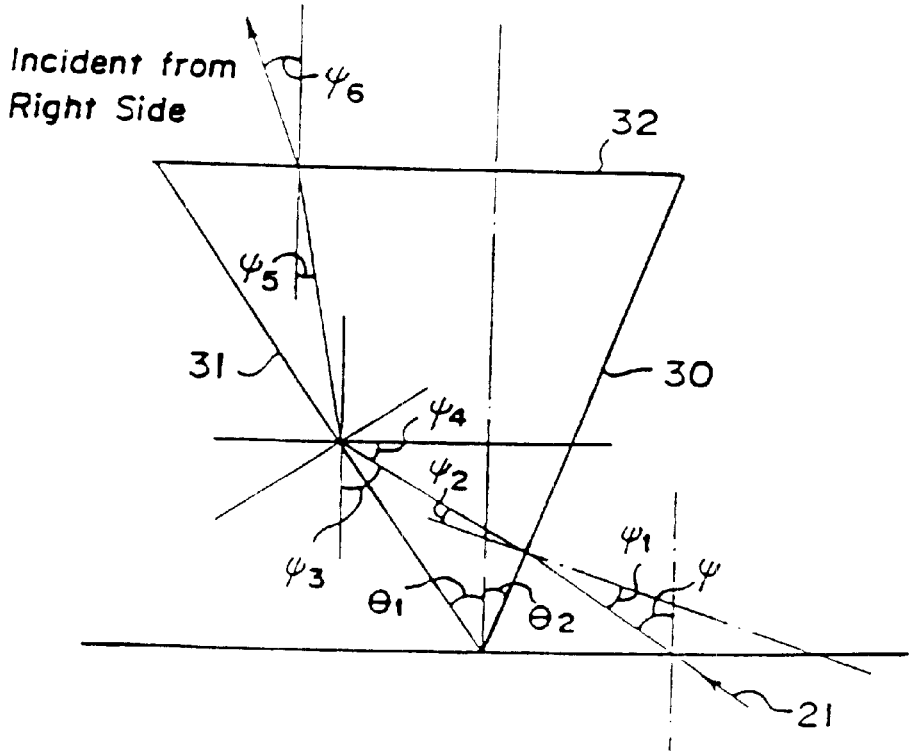

FIGS. 6(a) and 6(b) are diagrammatic representations showing one of such prisms of the second element as described just above. In FIGS. 6(a) and 6(b), reference numerals 20 and 21 represent emergent rays of light in the rightward and leftward directions, respectively, from the lens set 16 of the first element, $\theta_1$ and $\theta_2$ represent angles made by the normal lines and surfaces 31 and 30 of the prism, respectively, and reference numeral 32 represents an emergent surface (a second light emitting surface) of the prism. Further, reference symbols $\psi_1$ to $\psi_6$ and $\psi_1$ to $\phi_6$ denotes angles of rays with respect to the individual surfaces of the prism or reference lines. The angles are taken as shown in FIGS. 6(a) and 6(b).

Referring to FIG. 6(b), if a ray of light enters the prism from the right-hand side like a ray 21, it enters through the prism surface 30, then is totally reflected by the prism surface 31, and then emerges from the prism through the emergent surface 32 at a predetermined angle $\psi_6$. To the contrary, referring to FIG. 6(a), if a ray of light enters the prism from the left-hand side like a ray 20, it enters through the prism surface 31 and then is totally reflected by the prism surface 30 whereafter it emerges at the predetermined angle $\phi_6$ from the prism through the emergent surface 32. The predetermined angles $\psi_6$ and $\phi_6$ can be adjusted by the configuration of the lens units of the first element and the emergent angle from the lens set, the angles $\theta_1$ and $\theta_2$ and the refraction index n of the lens set.

It is to be noted that the configuration of the lenses 16 of the first element is not particularly limited and may be any one if emergent rays of light are concentrated in a particular direction so that the distribution of emitted light falls within a narrow range and besides the amount of emitted light is large. Further, while the lights 20, 21 may not always be emitted symmetrical to each other with respect to the normal line depending upon a configuration of the lens set 16 of the first element, in such a case the light can be emitted by the second element in a desired direction by varying the prism angles ($\theta_1$ and $\theta_2$ of FIG. 6) of each prism which is a component unit of a prism set of the second element.

It is to be noted that, as a special example of the present invention, where the first element emits the light at an angle of 60 degrees with respect to the normal line, the prism angles of the second element ($\theta_1$ and $\theta_2$ of FIG. 6) may be set to $\theta_1=\theta_2=30$ degrees in order to direct the light from the first element to the direction of the normal line.

Meanwhile, also as will be hereinafter described with reference to several embodiments of the present invention, the amount of light emitted by the light guide in the normal line direction i is very small (refer to FIG. 7(b)). Thus, the inventors examined a directivity of emitted light with a finely roughened surface formed by roughening a surface of a light guide serving as a first element as uniformly as possible. Such an examination revealed that almost all of light is emitted in directions of 70 to 80 degrees with respect to the normal line to the emitting surface. The present invention has been completed by an idea to combine the above light guide and a second element in order to change the direction of the light to the normal line direction. Here, the term "finely roughened surface" signifies a so-called "mat finished surface" and contains what is so-called "orange peel".

Figure 7:
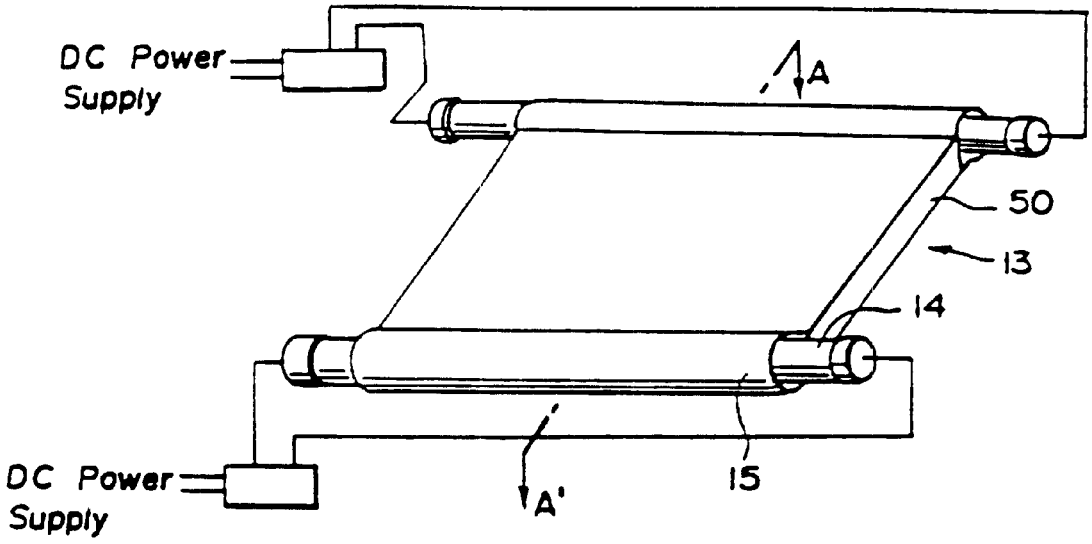
FIGS. 7(a) and 7(b) are a schematic perspective view and a schematic sectional view, respectively, showing a first element of a plane light source unit of the present invention together with lamp units.
Figure 7:
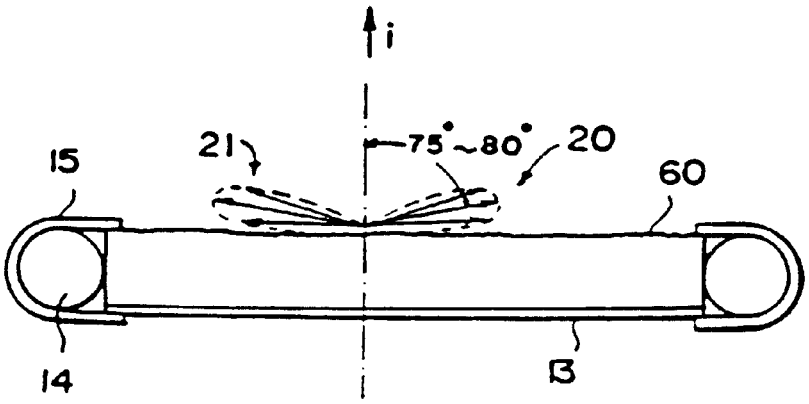
Figure 8:
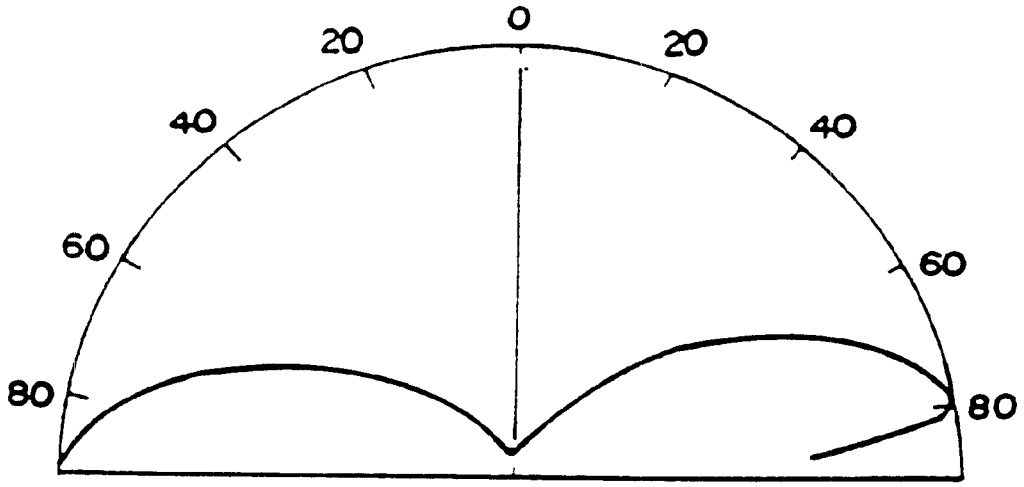
FIGS. 8(a) to 8(f) are diagrams showing angular distributions of light from different first elements of the present invention.
Figure 8:
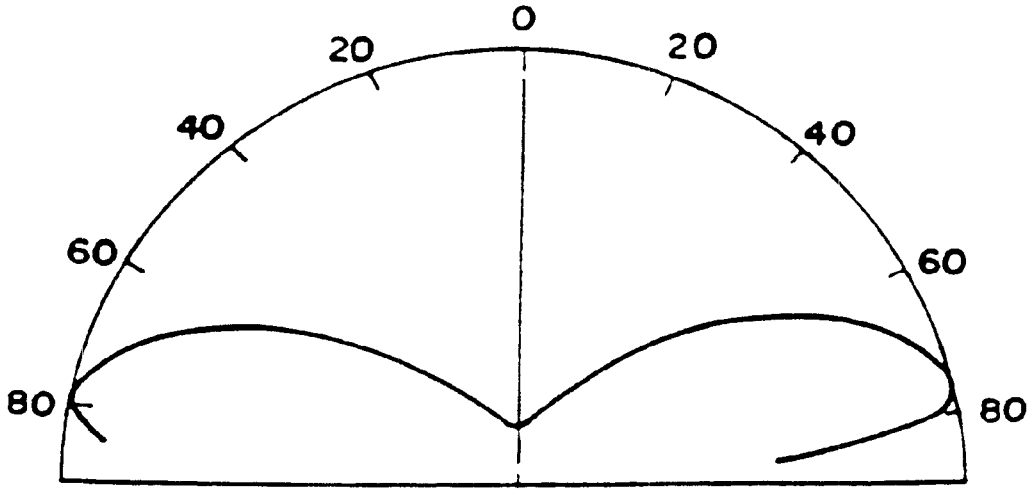
Figure 8:
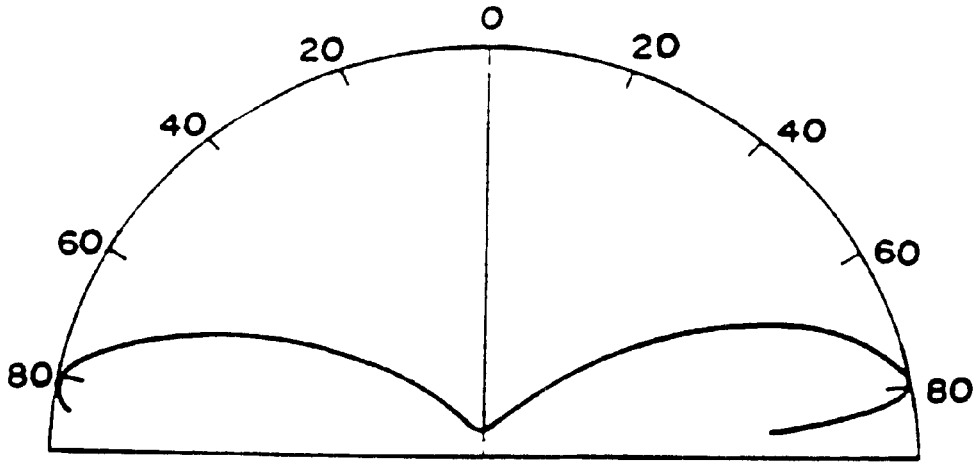
Figure 8:
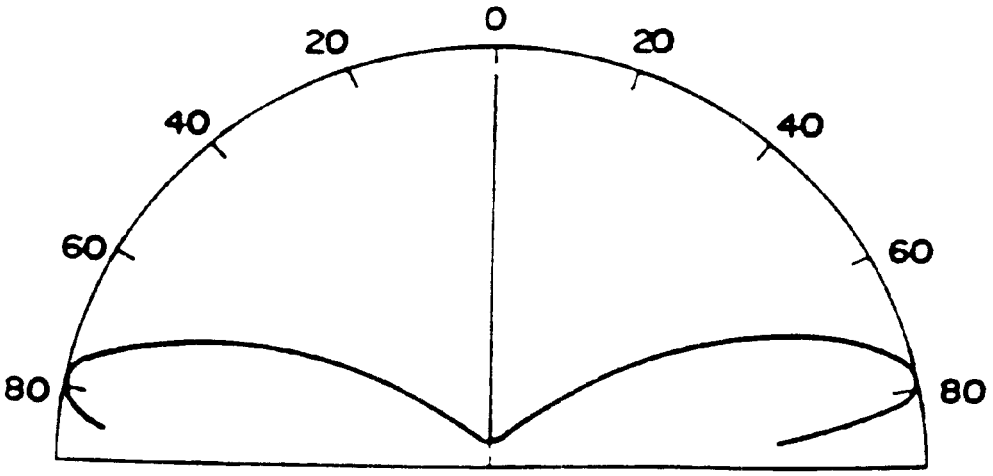
Figure 8:
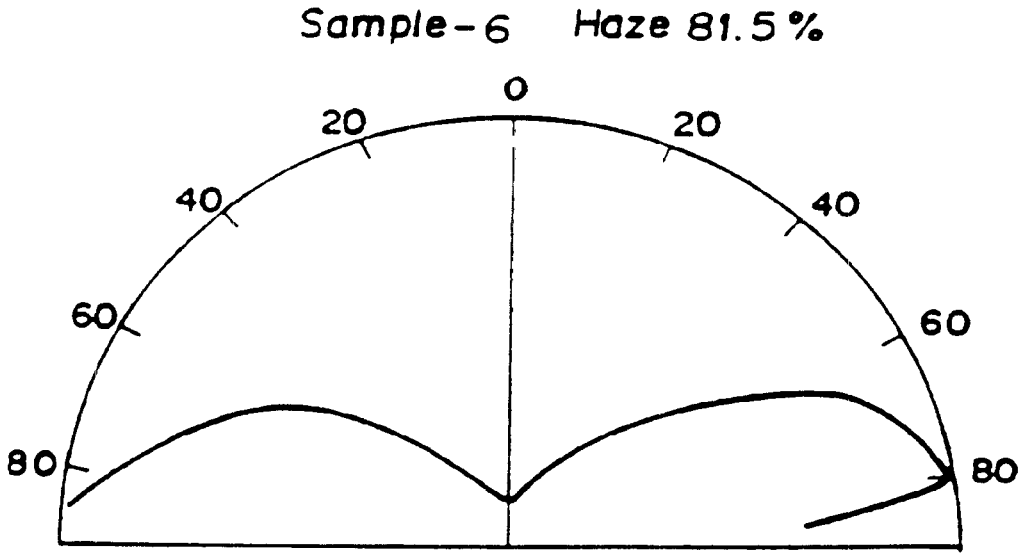
Figure 8:
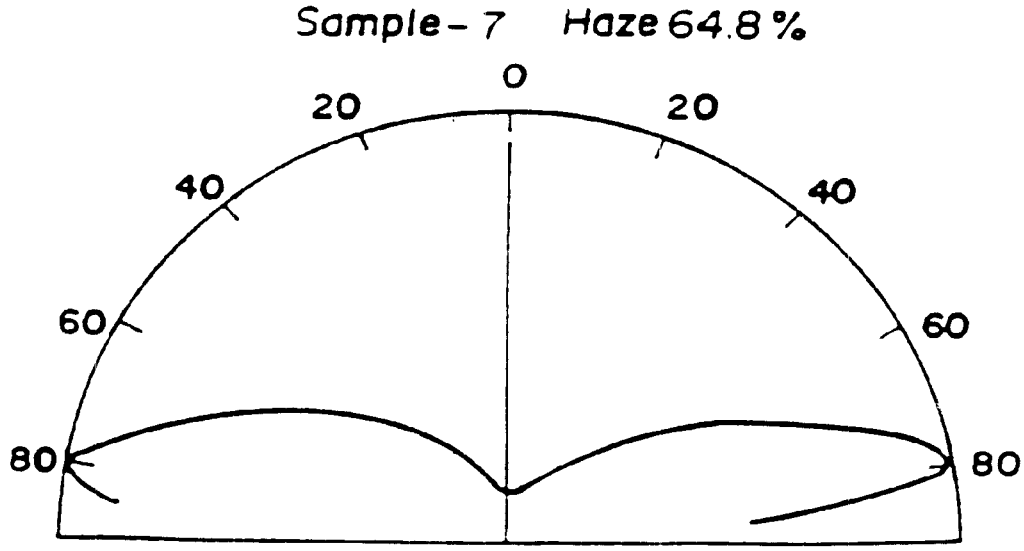

Construction of the first element is shown in a perspective view of FIG. 7(a). Referring to FIG. 7(a), a light emitting surface of the first element is mat finished uniformly while a reflecting layer 13 is formed on the opposite surface of the first element, and linear light sources 14 such as fluorescent lamps are arranged at opposite ends of the first element. FIG. 7(b) is a sectional view taken along line A–A' of FIG. 7(a).

FIGS. 8(a) to 8(f) are diagrams illustrating angular distributions of light shown in FIG. 7(b). In particular, FIGS. 8(a) to 8(f) illustrate rates of luminance at various angles where the maximum luminance value is represented by 100 percent (samples for measurement and measuring methods will be described below).

Figure 9:
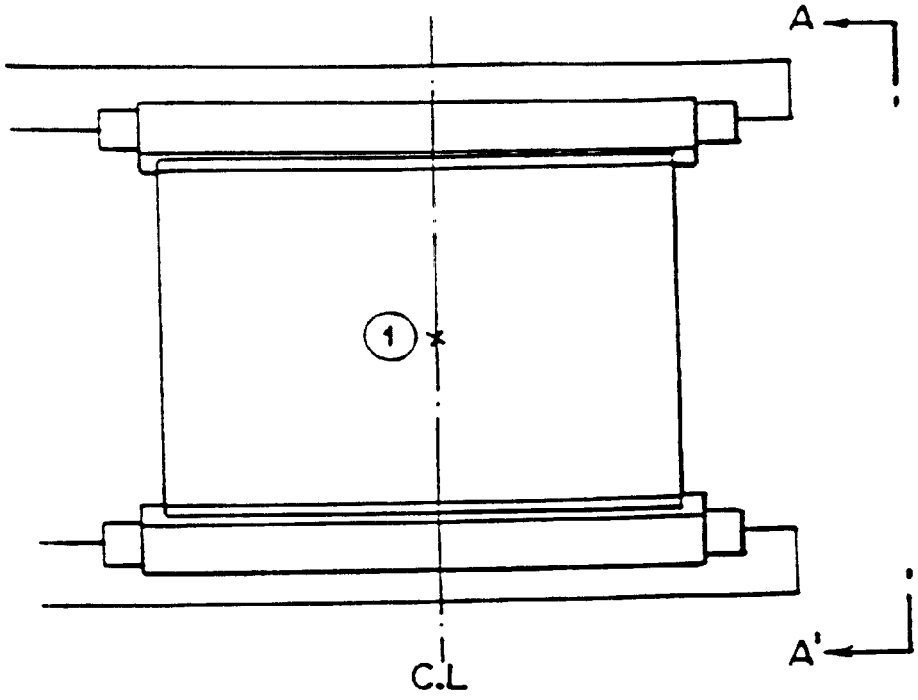
FIGS. 9(a) and 9(b) are diagrammatic representations illustrating a method of measuring an angular distribution of light.
Figure 9:
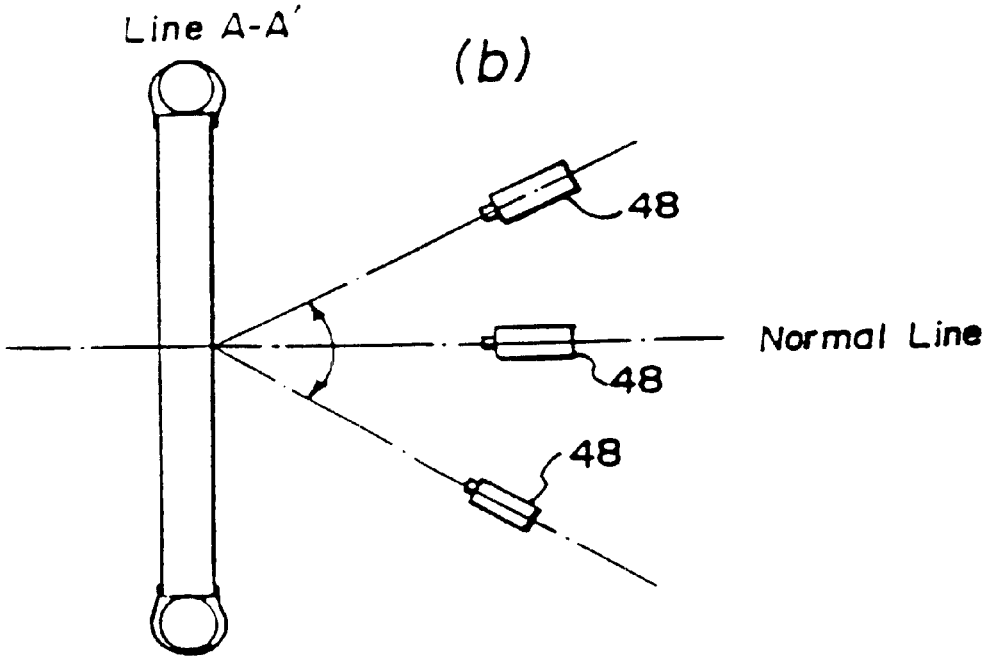

FIGS. 9(a) and 9(b) are diagrammatic representations illustrating measuring methods, and FIG. 9(a) is a front elevational view showing a measuring point and FIG. 9(b) is a view in the direction indicated by arrow marks A–A' of FIG. 9(a). In FIG. 9(b), reference numeral 48 represents a luminance meter. The results of the measurements are shown in FIGS. 8(a) to 8(f) from which it can be seen that little light is emitted in a direction normal to the emitting surface but emitted light is concreted in particular directions of 75 to 80 degrees (as also seen in FIG. 7(b)). Thus, the present invention is made on a principle that, making use of a light guide (first element) which has a mat finished emitting surface wherein emitted light is concentrated in a particular direction so that the distribution of light falls within a narrow range and the amount of emitted light is large, light 20 and 21 (refer to FIG. 7(b)) emitted toward the opposite sides of the normal line i are all refracted by a prism set serving as a second element to concentrate the light in a desired direction.

The prisms of the second element which makes another component for the function described above are similar to that shown in FIGS. 6(a) and 6(b).

It is to be noted that since the light emitted through the mat finished surface 60 of the first element is symmetrical with respect to the normal line, desired angles ($\psi_6$ and $\phi_6$) can be obtained by varying the prism angles ($\theta_1$ and $\theta_2$ of FIG. 6) and the refraction index of the second element.

In the following, particular construction of several plane light source units according to the present invention will be described in detail with reference to the drawings.

Figure 10:
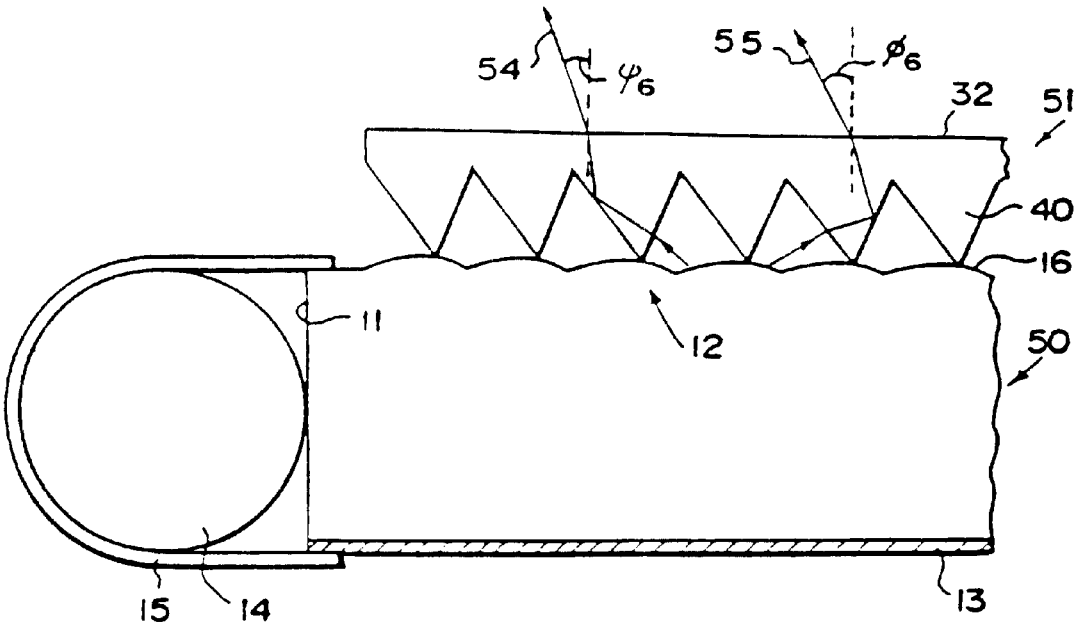
FIGS. 10 and 11 are schematic sectional views showing different plane light source units according to the present invention together with lamp.

FIG. 10 is a partial sectional view showing an embodiment of plane light source unit according to the present invention together with a lamp and is a view corresponding to FIG. 3(b).

Referring to FIG. 10, reference numeral 14 represents a light source such as a fluorescent lamp, 15 a reflector, 13 a reflecting layer formed on the opposite side to a first light emitting surface 12 of a first element 50, 16 a lens unit like the lens described hereinabove, 40 a prism unit, and a second light emitting surface 32. It is to be noted that the lens units 16 and the prism units 40 have convex linear configurations extending in a direction parallel to the light source (lamp).

The plane light source unit of the present embodiment thus comprises a first element 50 having a light incident face at least at one side end 11 of a light guide and a first light emitting surface which extends in a perpendicular direction to the incident face and on which the lens units 16 are formed, the first element 50 further having a reflecting layer 13 on the opposite surface of the light guide to the first light emitting surface, and a second element 51 having an incident surface on which the prism units 40 into which light from the first element 50 is introduced in predetermined directions are formed and a second light emitting surface 32. Light rays emerging from the individual lens units 16 are caused to emerge from the second element as represented by light rays 54 and 55, and the object of the invention can be attained by setting the lens units and the prism units such that the angles $\psi_6$ and $\phi_6$ may be substantially equal to each other.

Figure 11:
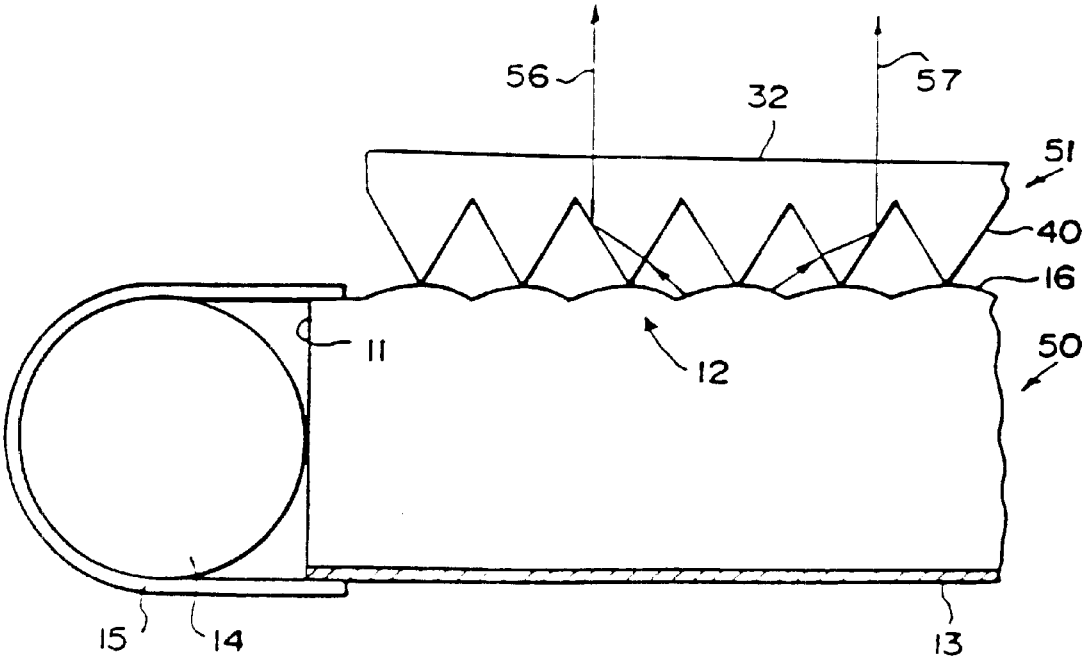

FIG. 11 is a diagrammatic representation showing an embodiment of plane light source unit wherein the lens units of the first element are set such that emergent light rays may emerge at angles of 60 degrees with respect to the normal line and the angles ($\theta_1$ and $\theta_2$ of FIG. 6) of the prism units of the second element 51 are set to $\theta_1\theta_2$=30 degrees. According to the embodiment, light emitted through the second light emitting surface 32 of the second element can be concentrated in the normal line direction as represented by light rays 56 and 57.

The elements of the plane light source unit of the present invention may be preferably made of such a material as an acrylic resin or a polycarbonate resin which has a higher transmittance to visible light to attain the object of small size and light weight, but the material of the elements need not be limited to such a specific material.

Further, while a small size fluorescent lamp is used as the light source 14, a linear light source having continuous configuration (for example, a filament lamp may be employed instead.

Subsequently, an example of determination of prism angles where the primary emergent rays from the first element emerge symmetrically to each other with respect to the normal line will be described. Also where the primary emergent rays do not emerge symmetrically to each other with respect to the normal line, prism angles can be determined in a similar manner. It is to be noted that a character n represents a refraction index of a material which constitutes the element.

(1) Where a light ray enters from the left-hand side of a prism: (all symbols are based on FIG. 6(a))

Where $90° - \psi < \theta_1$: (i)

$\phi_1 = (\theta_1 + \psi) - 90$, $\sin\phi_2 = \sin(\theta_1 + \psi - 90)/n$, $\phi_5 = 90 - (2\theta_2 + \theta_1 - \phi_2)$, $\sin\phi_6 = n \times \sin\phi_5$, $\phi_6 = \sin^{-1}(n \times \sin\phi_5)$ Where $90° - \psi > \theta_1$: (ii)

$\phi_1 = 90 - (\theta_1 + \psi)$, $\sin\phi_2 = \sin(90 - \theta_1 - \psi)/n$, $\phi_5 = 90 - (2\theta_2 + \theta_1 + \phi_2)$, $\sin\phi_6 = n \times \sin\phi_5$ Where $90° = \psi = \theta_1$: (iii)

$\phi_1 = 0$, $\phi_5 = 90 - (2\theta_2 + \theta_1)$, $\sin\phi_6 n \times \sin\phi_5$ (2) Where a light ray enters from the right-hand side of a prism: (all symbols are based on FIG. 6(b))

Where $90° - \psi < \theta_2$: (iv)

$\psi_1 = (\theta_2 + \psi) - 90$, $\sin\psi_2 = \sin(\theta_2 + \psi - 90)/n$, $\psi_5 = (2\theta_1 + \theta_2 - \psi_2) - 90$, $\sin\psi_6 = n \times \sin\psi_5$, Where $90° - \psi > \theta_2$: (v)

$\psi_1 = 90 - (\theta_2 + \psi)$, $\sin\psi_2 = \sin(90 - \theta_2 - \psi)/n$, $\psi_5 = (2\theta_1 + \theta_2 + \psi_2) - 90$, $$\sin\psi_6 = n \times \sin\psi_5$$

Where $90° - \psi = \theta_2$: (vi)

$$\psi_1 = 0,$$

$$\psi_5 = (2\theta_2 + \theta_1) - 90,$$

$$\sin\psi_6 = n \times \sin\psi_5$$

Meanwhile, where the prisms are made of an acrylic resin material, the refraction index is n=1.49, and if it is assumed that the incident angles to the prism 40 are symmetrical and ψ=55 degrees with respect to the normal line, the emergent angles of emergent light rays from the prisms calculated in accordance with the expressions given above are concentrated on the one side with respect to the normal line (only examples of calculations are given wherein the difference in emergent angle between two light rays from the left and right side falls within 2 degrees).

| $\theta_1$ | $\theta_2$ | Light from the Left-Hand Side ($\phi_6$) | Light from the Right-Hand Side ($\phi_6$) |
|---|---|---|---|
| 32° | 25° | 8.9° | 8.5° |
| 33° | 24° | 11.5° | 11.0° |
| 34° | 23° | 14.0° | 13.5° |
| 35° | 22° | 16.5° | 16.0° |
| 36° | 21° | 19.1° | 18.6° |
| 37° | 20° | 21.7° | 21.1° |
| 38° | 19° | 24.3° | 23.7° |
| 39° | 18° | 26.9° | 26.3° |
| 40° | 17° | 29.6° | 29.0° |
| 41° | 16° | 32.3° | 31.7° |
| 42° | 15° | 35.1° | 34.4° |

Meanwhile, where the prisms are made of a polycarbonate resin material, the refraction index is n=1.59, and calculations depending upon similar conditions to the acrylic resin material lead to the following results. Here, ψ=55 degrees (only examples of calculations are given wherein the difference in emergent angle between two light rays from the left and right sides falls within 2 degrees).

| $\theta_1$ | $\theta_2$ | Light from the Left-Hand Side ($\phi_6$) | Light from the Right-Hand Side ($\phi_6$) |
|---|---|---|---|
| 32° | 25° | 9.7° | 8.4° |
| 33° | 24° | 12.4° | 11.0° |
| 34° | 23° | 15.0° | 13.6° |
| 35° | 22° | 17.7° | 16.2° |
| 36° | 21° | 20.3° | 18.9° |
| 37° | 20° | 23.1° | 21.6° |
| 38° | 19° | 25.8° | 24.3° |
| 39° | 18° | 28.6° | 27.0° |
| 40° | 17° | 31.4° | 29.8° |
| 41° | 16° | 34.3° | 32.6° |

While in the case of the embodiments of FIGS. 10 and 11 the lens units 16 are formed on the first light emitting surface of the light guide of the first element 50, similar effects can be attained otherwise by forming lens units on a surface opposite to the first light emitting surface of the light guide of the first element or else by forming lens units on both of the light emitting surface and the opposite surface of the light guide if characteristic of the lens units are suitably selected.

Figure 12:
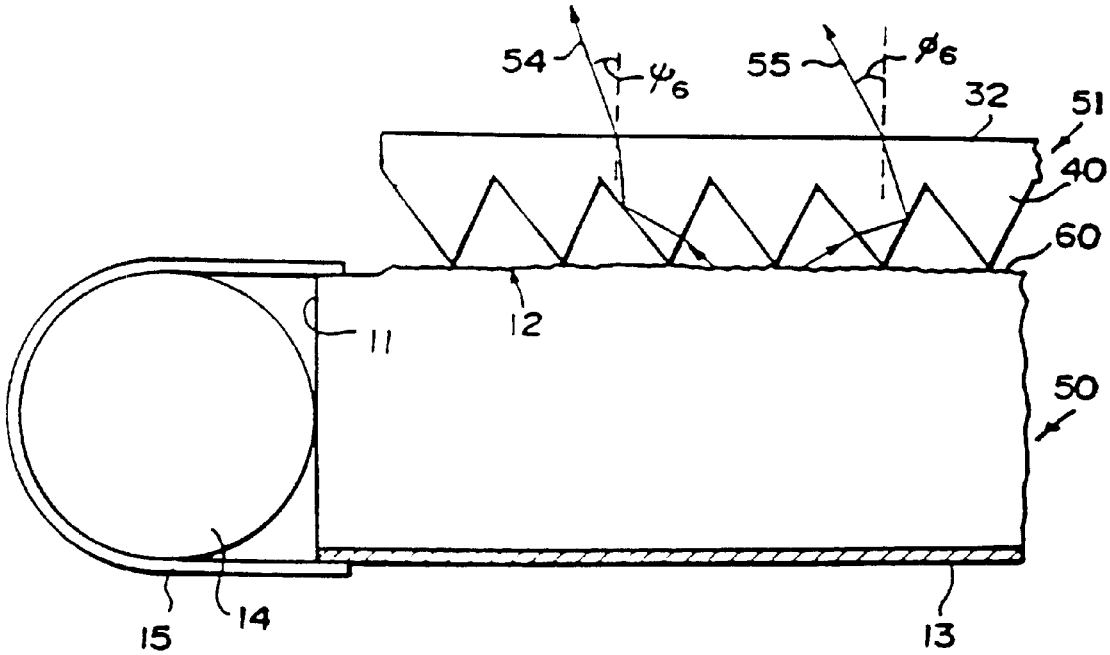
FIG. 12 is a schematic sectional view but showing a further different plane light source unit according to the present invention.

FIG. 12 is a partial sectional view of a plane light source unit together with a lamp showing a further embodiment of the present invention.

Referring to FIG. 12, reference numeral 14 represents a light source such as a fluorescent lamp, 15 a reflector, 13 a reflecting layer formed on the opposite side to a first light emitting surface 12 of a first element 50, and 60 a mat finished first light emitting surface, which is substantially parallel to the reflecting layer 13. Reference numeral 40 represents a prism unit of a second element, and 32 a second light emitting surface of the prism units 40. The prism units 40 have a convex linear configuration extending in a direction parallel to the light source (lamp).

The plane light source unit of the present embodiment thus comprises a first element 50 having a light incident face at least at one side end 11 thereof and a mat finished first light emitting surface 12 which extends a perpendicular direction to the incident face, the first element 50 further having a reflecting layer 13 on the opposite side thereof to the first light emitting surface, and a second element 51 having an incident surface on which the prism units 40 into which light from the first element 50 is introduced and from which light rays emerge in predetermined directions are formed and a second light emitting surface 32.

Light rays emerging from the first element are caused to emerge from the second element as represented by light rays 54 and 55, and the object of the invention can be attained by setting the prism units such that the angles $\psi_6$ and $\phi_6$ may be substantially equal to each other.

Subsequently, determination of prism angles where the primary emergent rays from the first element emerge symmetrically to each other with respect to the normal line is carried out in a similar manner to those of FIGS. 10 and 11.

Thus, where the prisms are made of an acrylic resin material, the refraction index is n=1.49, and if it is assumed that the incident angles to the prism 40 are symmetrical and ψ=65 degrees with respect to the normal line, the emergent angles of emergent rays of light from the prisms calculated in accordance with the expressions given hereinabove are concentrated on the one side with respect to the normal line (only examples of calculations are given wherein the difference in emergent angle between two light rays from the left and right sides falls within 2 degrees).

| $\theta_1$ | $\theta_2$ | Light from the Left-Hand Side ($\phi_6$) | Light from the Right-Hand Side ($\phi_6$) |
|---|---|---|---|
| 32° | 28° | 8.5° | 8.9° |
| 36° | 27° | 11.0° | 11.5° |
| 37° | 26° | 13.5° | 14.0° |
| 38° | 25° | 16.0° | 16.5° |
| 39° | 24° | 18.6° | 19.1° |
| 40° | 23° | 21.1° | 21.7° |
| 41° | 22° | 23.7° | 24.3° |
| 42° | 21° | 26.3° | 26.9° |
| 43° | 20° | 29.0° | 29.6° |

Figure 13:
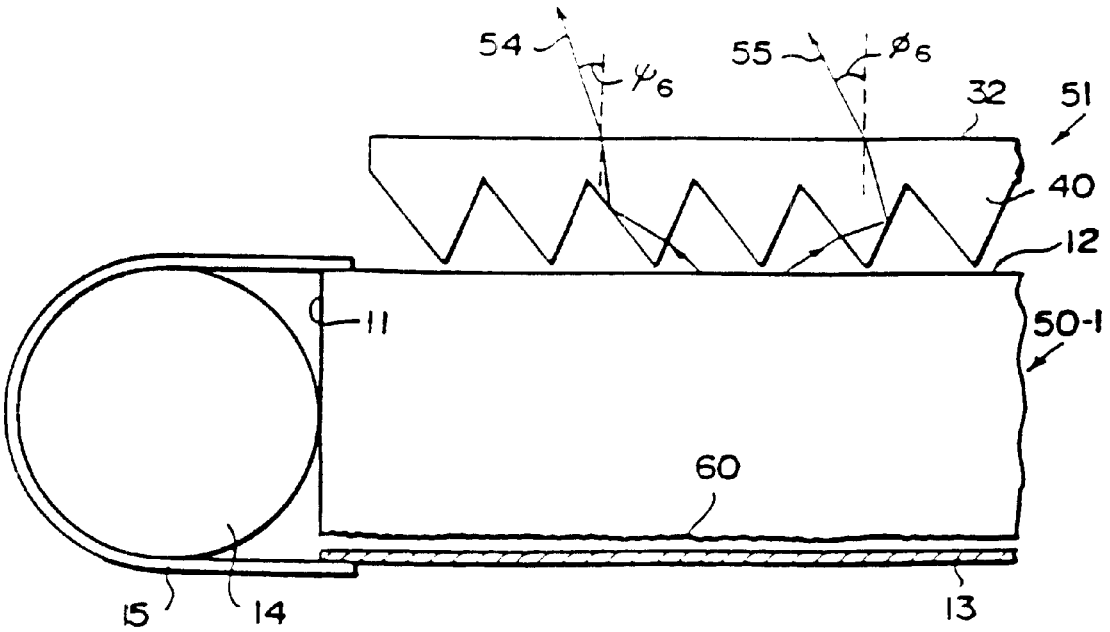
FIGS. 13 and 14 are schematic sectional views but showing still further different plane light source unit according to the present invention.
Figure 14:
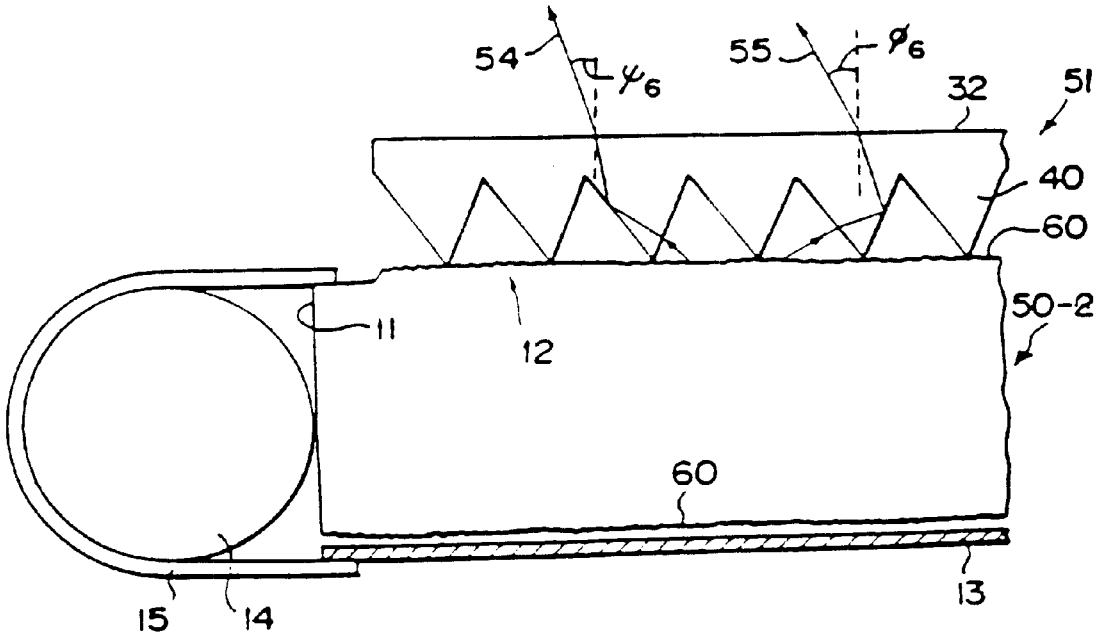

FIGS. 13 and 14 are partial sectional views of plane light source unit together with a lamp, showing still further embodiments of the present invention.

Referring to FIG. 13, a first element (light guide) 50-1 has such a configuration that the opposite side to a first light emitting surface 12 is formed as mat finished surface 60 and is disposed opposing to a reflecting layer 13, and the first light emitting surface 12 of the first element 50-1 is formed as a smooth surface. FIG. 14 shows an example of construction wherein a first element 50-2 is used in which upper and lower surfaces are formed as mat finished surfaces 60. It is to be noted that the description that an imaginary plane of mat finished first light emitting surface of a light guide extends substantially in a parallel relationship to the reflecting layer 13 in the present invention means that the first element is a member in the form of a plate having a uniform thickness, and therefore the present invention has an advantage that it employs a transparent member which can be readily produced and assembled.

In the following, there are described various examples of construction of the present invention which are designed for backlighting for a 3-inch liquid crystal TV set and wherein the size of a panel is 61 mm long×56 mm wide.

While the examples of construction of the present invention described below were produced using a plate of a transparent acrylic resin material having a thickness of 5 mm for the first element and another plate of an acrylic resin material or a polycarbonate resin material having a thickness of 1 mm for the second element, it is apparent that the sizes and the materials are not limited to such specific ones.

EXAMPLES

Example 1-1

Using a metal mold for convex cylindrical lenticular lenses of smooth curved surfaces wherein the pitch is 0.38 mm and the height of the curved lens surfaces is 0.051 mm (refer to FIG. 15), the lens pattern of the metal mold was transferred to an acrylic resin plate having a thickness of 5 mm by thermal press work to make a first element. Meanwhile, a viewing angle and an inclination angle from the normal line to the picture plane of a portable liquid crystal TV set were measured and the emergent angle was determined so that it might be 15 degrees ($\psi_6=\phi_6$) with respect to the normal line to the picture plane while the prism angles were set to 35 degrees ($=\theta_1$) on the left-hand side and 22 degrees on the right-hand side ($=\theta_2$) (refer to FIGS. 6(a) and 6(b)). Then, a metal mold having a multi-prism pattern wherein the pitch was 0.38 mm and each of the thus set prisms had an apex angle ($=\theta_1+\theta_2$) of 57 degrees was produced, and using the metal mold, the multi-prism pattern was transferred to an acrylic resin plate having a thickness of 1 mm by thermal press work to make a second element. The first and second elements were cut in predetermined sizes.

Subsequently, the two opposite sides of the first element having the length of 61 mm were polished by a conventional polishing method while aluminum vacuum deposited polyester films with an adhesive layer were applied to the other opposite sides having the width of 56 mm, and another silver vacuum deposited polyester film was secured on the surface opposing to the transferred lens surface. A fluorescent lamp having a diameter of 8 mm and a length of 90 mm (FLE-8.90 ADIPS 3 by Elevam Corp.) was arranged on each of the two sides of 61 mm length of the first element, and a reflector made of aluminum foil was applied to each of the lamps. Each lamp was then lit by means of DC 5 V power supply with an invertor. Luminance was then measured at the points near the lamps and the central point on a center line of the first element (refer to FIG. 5(a)) at various angles with respect to the normal line by means of a luminance meter (luminance meter nt-1 by Minolta Camera Co., Ltd.), and angular distributions of light were determined (refer to FIG. 5(b)). The data obtained in this manner are illustrated in FIGS. 4(a) and 4(b) mentioned hereinabove. Maximum luminance values of those points are listed in Table 1 below.

| | |
|---|---|
| Luminance Values observed at 55 degrees on the left and right side, respectively; at the central points | 3,500 cd/m$^2$, 3,200 cd/m$^2$ |
| Luminance values observed at 55 degrees on the left and right side, respectively; at point spaced by 10 mm from the lamp | 4,000 cd/m$^2$, 3,800 cd/m$^2$ |

Figure 16:
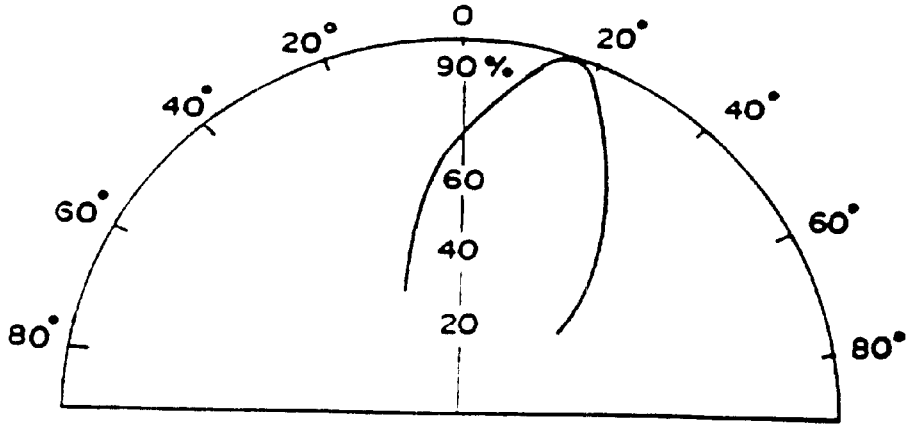
FIGS. 16(a), 16(b) and 16(c) are diagrams showing angular distributions of light in the case of the example 1-1.
Figure 16:
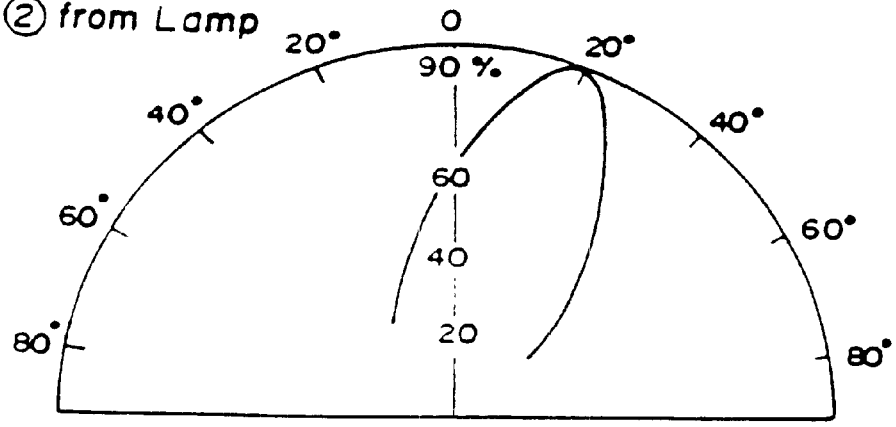
Figure 16:
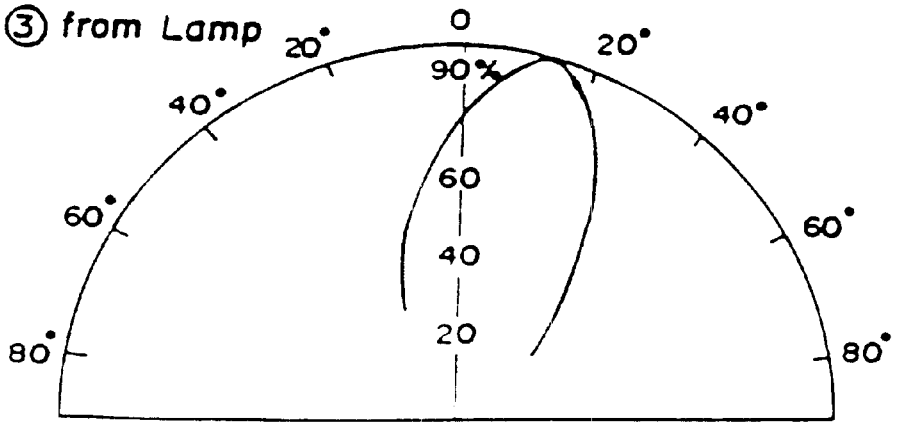

Further, the second element was arranged on the first element with the prism side of the former opposed to the lens side of the latter and was secured to the sides of the image by means of double-sided adhesive tapes having a width of about 5 mm. Then, similar measurements to those of the first element were carried out by a quite same method, and angular distributions of light were determined. The data thus obtained are illustrated in FIGS. 16(a), 16(b) and 16(c). Maximum luminance values and angles at which the maximum luminance value was observed are listed in Table 2 below.

TABLE 2

| | Maximum Luminance Value | Angle |
|---|---|---|
| Central Point 1 | 3,100 cd/m$^2$ | 15° |
| 10 mm Point from Lamp 2 | 3,500 cd/m$^2$ | 20° |
| 10 mm Point from Lamp 3 | 3,700 cd/m$^2$ | 12° |

The angles at which the maximum luminance value was observed fall within a narrow range from 12 to 20 degrees, and the half-width of angular distribution is about 40 degrees.

It is to be noted that the luminance value of lamp surface in the present example was 10,000 cd/m$^2$.

Example 1-2

Figure 17:
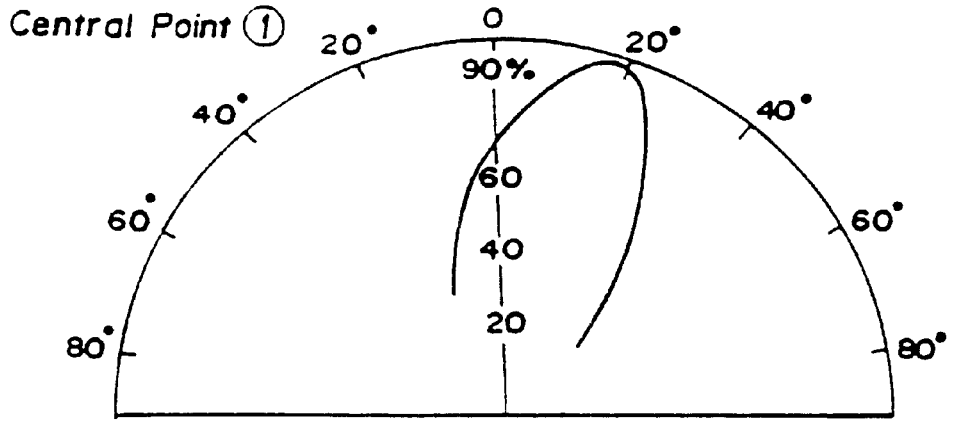
FIGS. 17(a), 17(b) and 17(c) are diagrams showing angular distributions of light in the case of another example 1-2.
Figure 17:
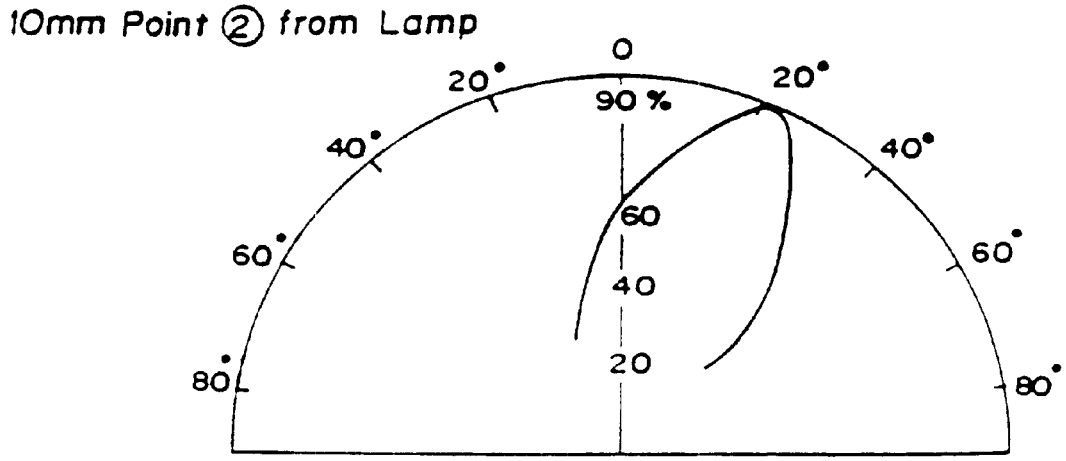
Figure 17:
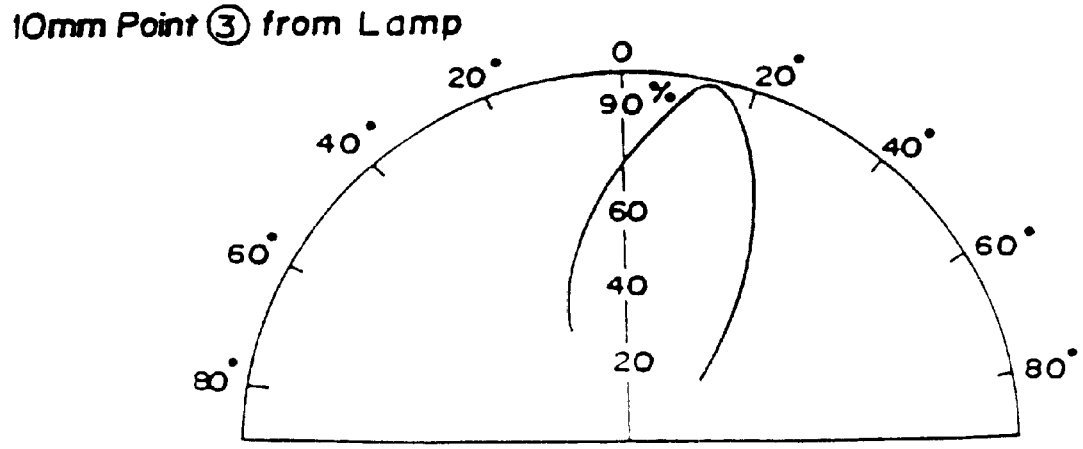

The same first element as in the example 1-1 described above was used, and while the same metal mold for preparing the second element as in the example 1-1 was used, the second element was produced from a polycarbonate resin plate having a thickness of 1 mm. Then, angular distributions of light were measured in luminance value by the similar setting to that of the example 1-1. The resultant data are illustrated in FIGS. 17(a) and 17(b). Meanwhile, maximum luminance values and angles at which the maximum luminance value was observed are listed in Table 3 below.

TABLE 3

| | Maximum Luminance Value | Angle |
|---|---|---|
| Central Point 1 | 3,200 cd/m$^2$ | 17° |
| 10 mm Point from Lamp 2 | 3,700 cd/m$^2$ | 23° |
| 10 mm Point from Lamp 3 | 3,400 cd/m$^2$ | 12° |

Example 1-3

The same first element as in the example 1-1 was used. While it is a requirement that the emergent angle of emergent light rays from a first element be 60 degrees in order to emit light from a plane light source unit in the direction of the normal line, because more than 90 percent of the maximum luminance value is exhibited at the angle of 60 degrees as can be seen from FIGS. 4(a) and 4(b), a metal mold for a multi-prism pattern wherein the prism angles were set to $\theta_1=\theta_2=30$ degrees and the prism pitch was set to 0.38 mm was produced, and the multi-prism pattern was thermally transferred to an acrylic resin plate of a thickness of 1 mm to make a second element.

Figure 18:
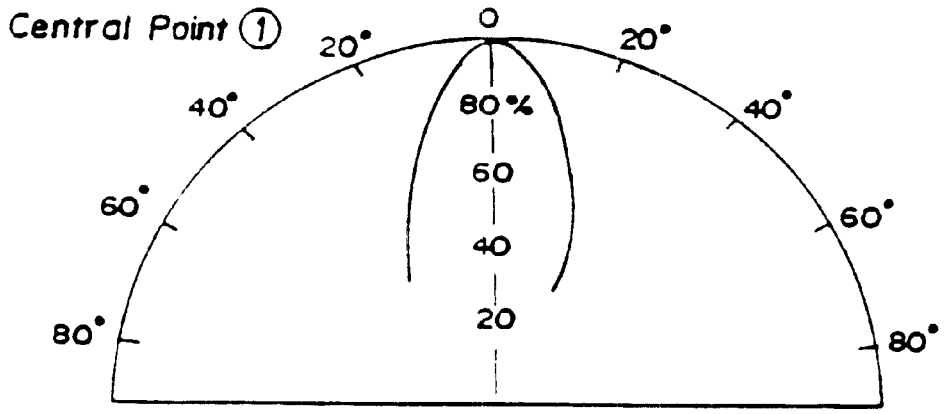
FIGS. 18(a), 18(b) and 18(c) are diagrams showing angular distributions of light in the case of a further example 1-3.
Figure 18:
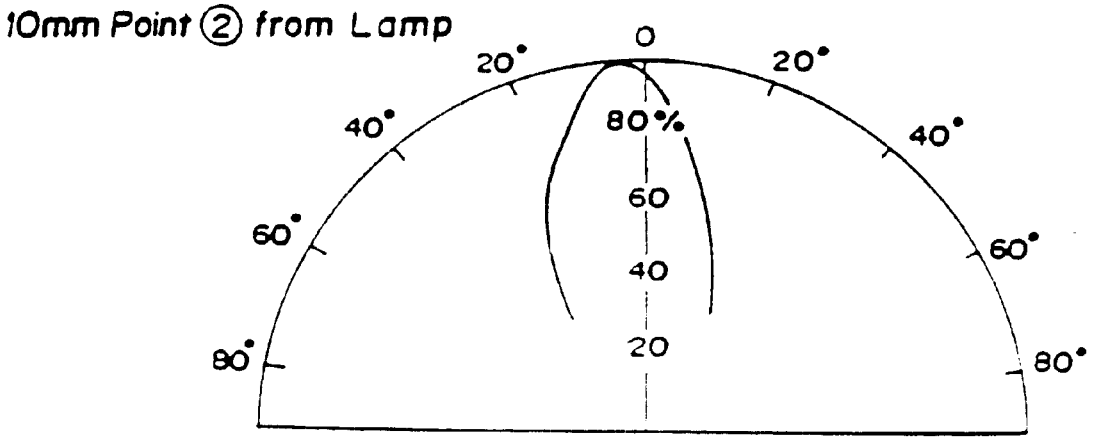
Figure 18:
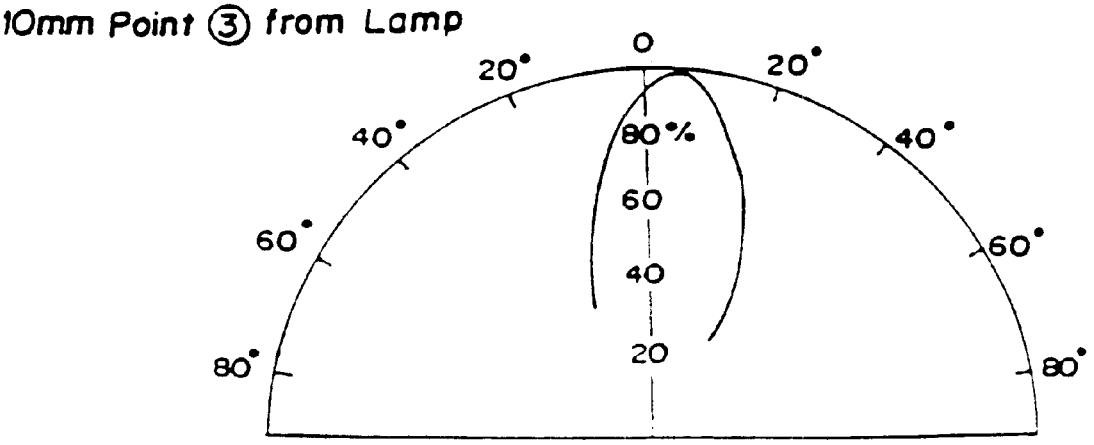

Angular distributions of light were measured in luminance value with quite similar settings to those of the example 1-1 described hereinabove. The resultant data are illustrated in FIGS. 18(a), 18(b) and 18(c). Meanwhile, maximum luminance values and angles at which the maximum luminance value was observed are listed in Table 4 below.

TABLE 4

| | Maximum Luminance Value | Angle |
|---|---|---|
| Central Point 1 | 2,900 cd/m$^2$ | 0° |
| 10 mm Point from Lamp 2 | 3,100 cd/m$^2$ | −5° |
| 10 mm Point from Lamp 3 | 3,200 cd/m$^2$ | 7° |

Comparative Example

Acrylic resin pellet (HIPET HBS [trademark] by Mitsubishi Rayon Co., Ltd.) was dry-blended with 1.5 percent by weight of rutile type titanium oxide and molded into a film of 50 microns thickness by a conventional extruder. The film was extended on an inorganic flat glass plate so as not to include air bubbles, and after being provisionally secured with methylmethacrylate, a cell was formed with glass plates by means of a spacer in a conventional manner. Methylmethacrylate syrup was poured in the clearance of the cell and polymerized to cure by a conventional manner to obtain an acrylic resin plate of 5 mm thickness.

Figure 19:
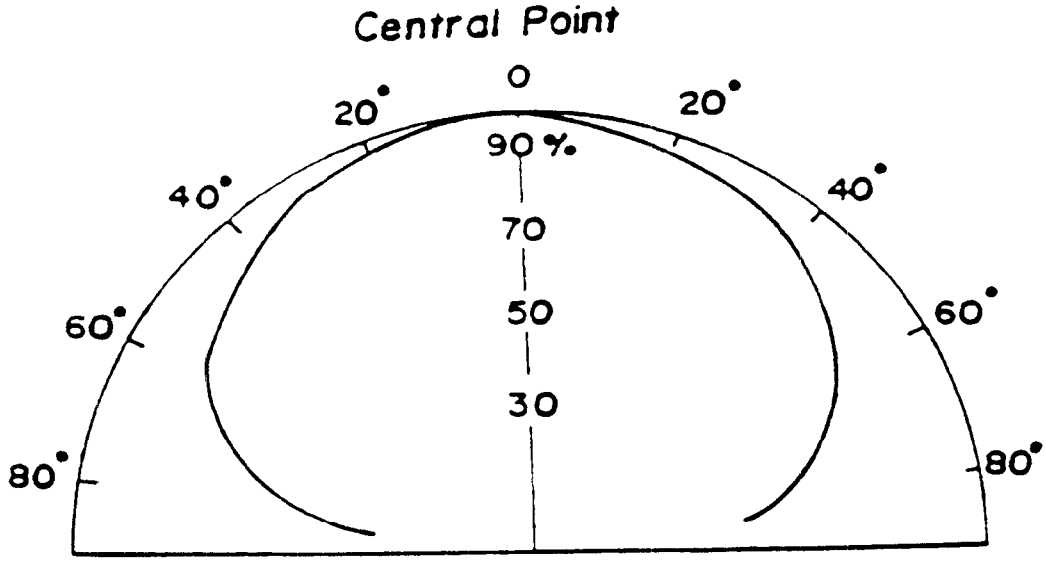
FIGS. 19(a) and 19(b) are diagrams showing angular distributions of light in the case of a plane light source device of a comparative example.
Figure 19:
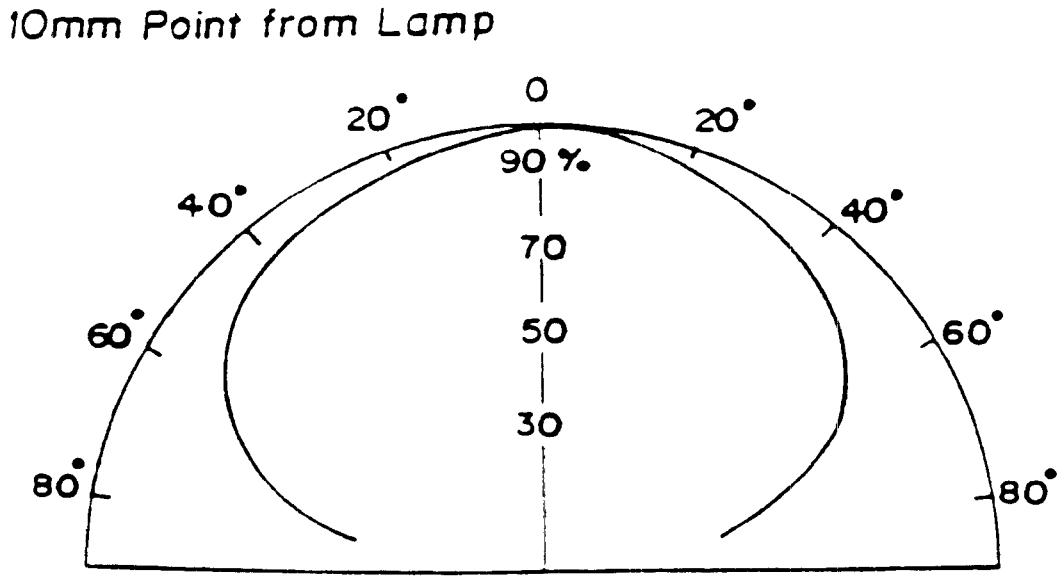

The plate produced in this manner was cut into a size of 61 mm length×56 mm width, and the two sides of 61 mm length were polished in a conventional manner while aluminum vacuum deposited films with an adhesive layer were adhered to the other opposite sides of 56 mm width, whereafter a silver vacuum deposited polyester film (similar to that of the example 1-1) was arranged on the surface opposite to a white thin layer formed on the surface of the plate. Subsequently, evaluation was made by a quite same method as the measuring method of the first element of the example 1-1. The resultant data are illustrated in FIGS. 19(a) and 19(b). Meanwhile, luminance values at the specific points are listed in Table 5 below.

TABLE 5

| | Maximum Luminance Value |
|---|---|
| Central Point 1 | 900 cd/m$^2$ |
| 10 mm Points from Lamp 2 & 3 | 1,200 cd/m$^2$ |

Summary

As can be seen from comparison between, for example, FIGS. 16(a), 16(b) and 16(c) and FIGS. 19(a) and 19(b), while the plane light source unit produced in comparative example has a characteristic that light is emitted uniformly in all directions, the plane light source unit produced in accordance with the present invention has advantages that light is emitted in particular direction and that the maximum luminance value at the central point is higher, about 3.5 times, than that obtained in comparative example.

Example 2

Production of Various First Elements

As described hereinabove, the lenses 16 of the first element may have any configuration only if light is concentrated in particular directions so that the angular distribution of light falls within narrow ranges and the amount of emitted light is large, and the configuration of the lenses 16 is not particularly limited. As examples of such lens configurations, first elements having lenses of the following configurations were produced including the first element of the convex cylindrical lenticular lenses in the examples 1-1 to 1-3 described hereinabove.

Figure 15:
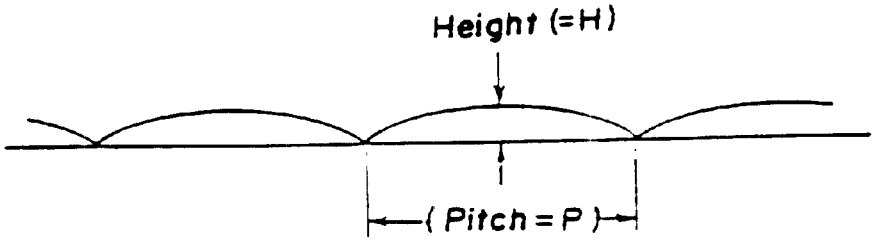
FIG. 15 is a schematic view illustrating an example of lens unit of a first element.

(1) Lens which has a substantially similar configuration to that of the convex cylindrical lenticular lens shown in FIG. 15 and wherein Pitch P=0.38 mm, Height H=0.05 mm, and Thickness of the first element t=6 mm.

Figure 20:
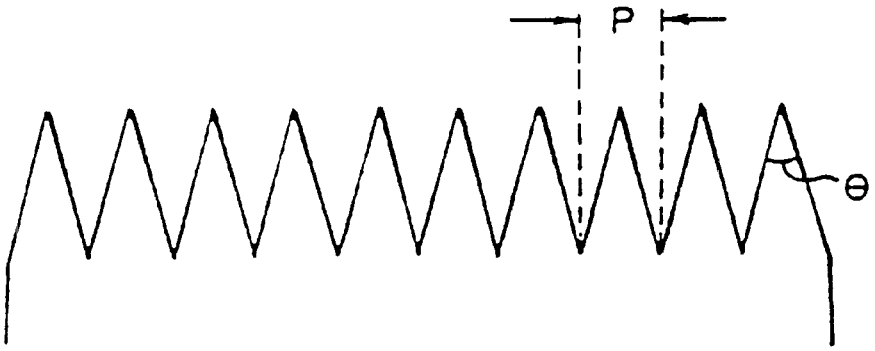
FIG. 20 is a schematic sectional view showing a first element wherein lens units are triangular pole-shaped lenticular lenses.

(2) Triangular pole-shaped lenticular lens which has such a configuration as shown in FIG. 20 and wherein Pitch P=0.5 mm, Apex Angle θ=25 degrees, and Thickness of the first element t=6 mm.

Figure 21:
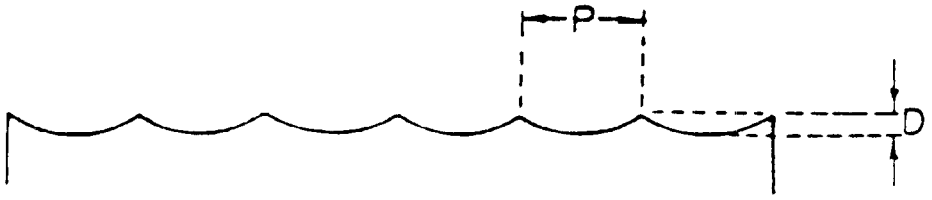
FIG. 21 is a schematic sectional view showing another first element wherein lens units are concave cylindrical lenticular lenses.

(3) Concave cylindrical lenticular lens which has such a configuration as shown in FIG. 21 and wherein Pitch P=0.5 mm, Depth D=0.06 mm, and Thickness of the first element t=6 mm.

Figure 22:
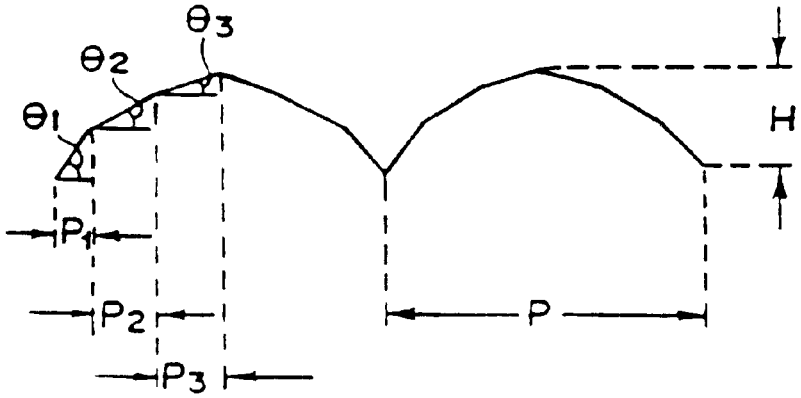
FIG. 22 is a schematic sectional view showing a further first element wherein lens units are convex polygonal pole-shaped lenticular lenses.

(4) Polygonal pole-shaped lenticular lens which has such a configuration as shown in FIG. 22 and wherein Pitch $P_1$=0.10 mm, $\theta_1$=30 degrees, Pitch $P_2$=0.15 mm, $\theta_2$=10 degrees, Pitch $P_3$=0.15 mm, $\theta_3$=5 degrees, Pitch P=0.8 mm, Height H=0.097 mm, and Thickness of the first element t=6 mm.

(5) Anisotropic lenticular lenses

Figure 23:
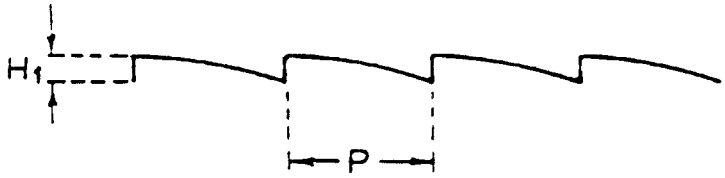
FIGS. 23(a) and 23(b) are schematic sectional views showing still further first elements wherein lens units are different anisotropic lenticular lenses.
Figure 23:
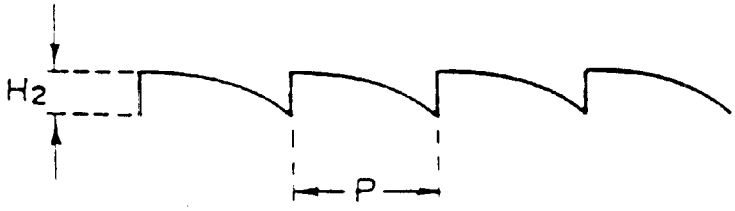

① Anisotropic lenticular lens A which has such a configuration as shown in FIG. 23(b) and wherein Pitch P=0.41 mm, Height $H_2$=0.102 mm, and Thickness of the first element t=6 mm.

The first elements were produced by transferring lens patterns to acrylic resin plates of 6 mm thickness by thermal press work using metal molds which have individually such predetermined configurations as described above.

Light Emitting Characteristics of Individual First Elements

Figure 24:
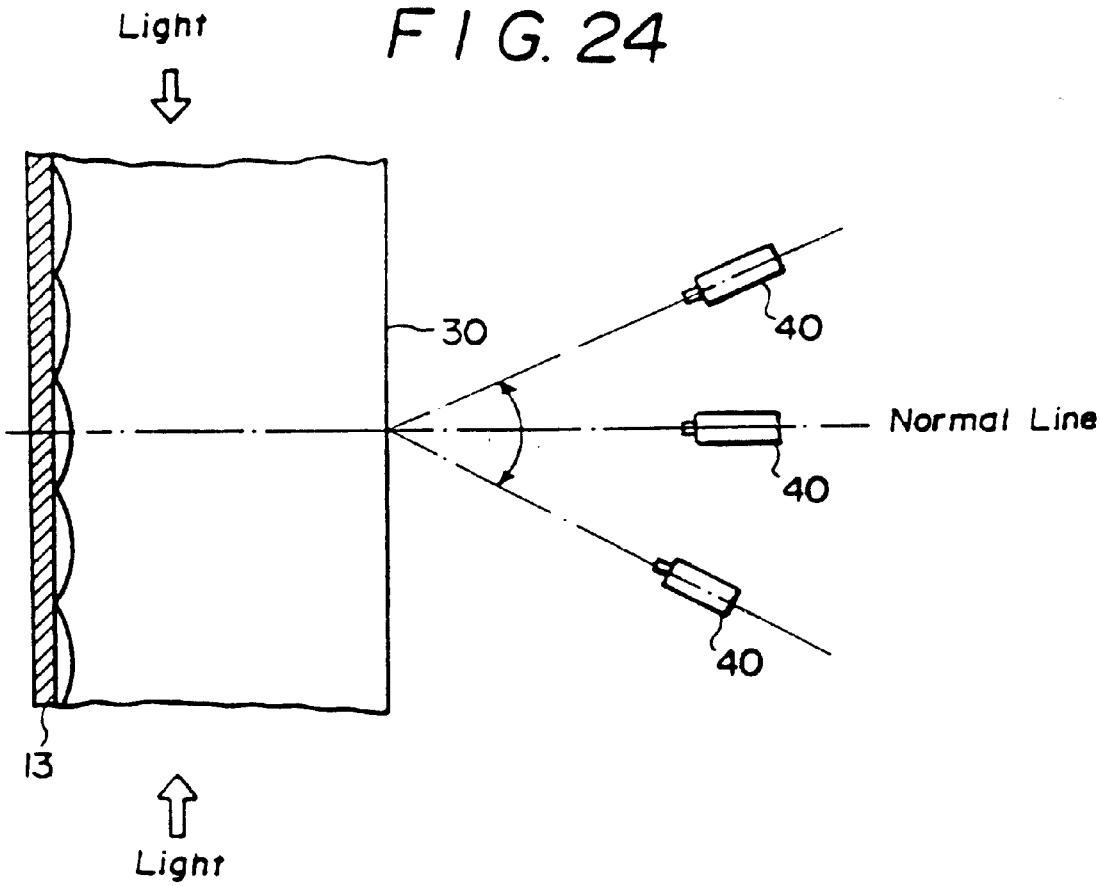
FIG. 24 is a diagrammatic sectional view illustrating a manner of measuring angular distributions of light from a first element of reverse type.

Angular distributions of light of the individual first elements were determined by a similar method to that described hereinabove with reference to FIG. 5(b). In particular, the two sides of 61 mm length of each of the first elements were polished by a conventional method while aluminum vacuum deposited polyester films with an adhesive layer were applied to the other two sides of 56 mm width. Then, a silver vacuum deposited polyester film was secured on a surface of each first element opposing to the thus transferred lens surface, and then a fluorescent lamp having a diameter of 8 mm and a length of 90 mm (FLE-8.90 ADIP 3 by Elevam Corp.) was arranged on each of the two sides of 61 mm length of each first element with aluminum foil applied as a reflector, whereafter the lamp was lit by means of DC 5 V power supply with an invertor. The construction in this case will be hereinafter referred to as front type. It is to be noted that, before angular distributions of light were examined, in order to make sure that such a construction can be adopted that a reflecting layer is positioned on the surface of lenses 16 such that light emitted from the lenses 16 may be reflected by the reflecting layer and then, after being transmitted through the first element 50, is emitted through the emitting surface on the opposite side to the lenses 16 (hereinafter referred to as reverse type), the lens surfaces of the first elements (1) to (5) specified as above were faced a mirror and angular distributions of such emitted light were measured. The manner of such measurement is illustrated in FIG. 24 by way of example of the concave cylindrical lenticular lens. In FIG. 24, reference numeral 13 represents a mirror.

Figure 25:
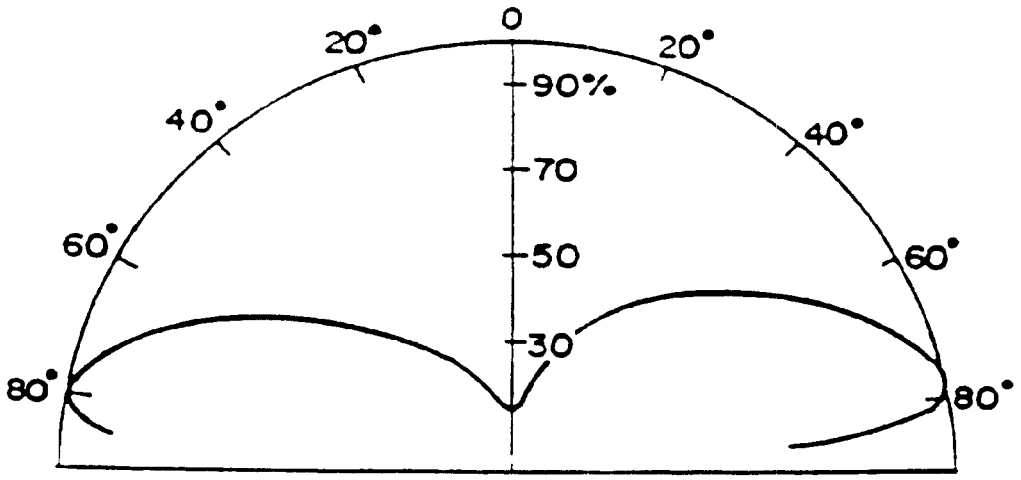
FIGS. 25(a) and 25(b) are diagrams showing angular distributions of light emitted by first elements in the case of the front and reverse types, respectively, wherein convex cylindrical lenticular lenses are employed.
Figure 25:
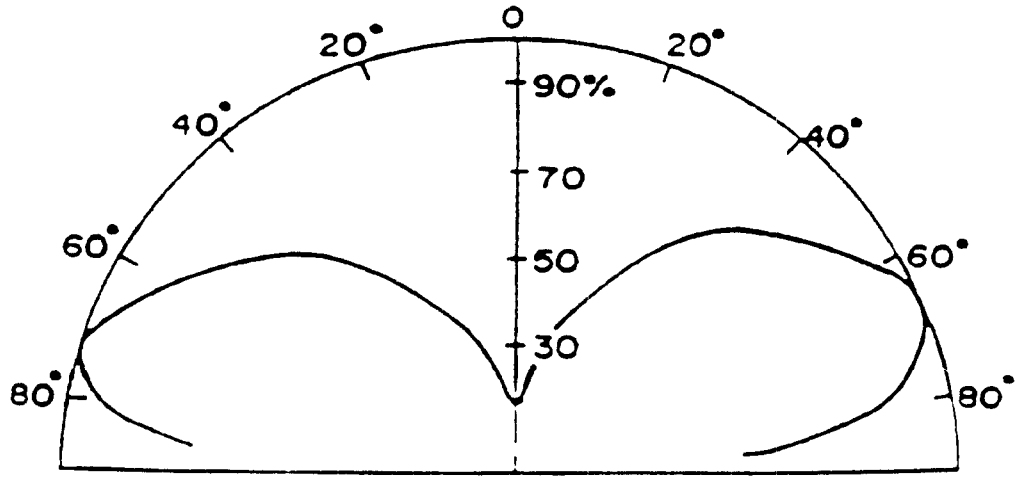

RESULTS OF MEASUREMENTS OF ANGULAR DISTRIBUTIONS OF LIGHT (1) FIG. 25(b) illustrates the angular distribution of light from the first element of the reverse type in which the convex cylindrical lenticular lenses of the configuration shown in FIG. 15 were employed. Meanwhile, the angular distribution of light from the first element of the front type is illustrated in FIG. 25(a). The maximum luminance value appeared in the direction of about 70 degrees from the normal line in the case of the first element of the reverse type but in the direction of about 70 to 80 degrees from the normal line in the case of the first element of the front type.

Figure 26:
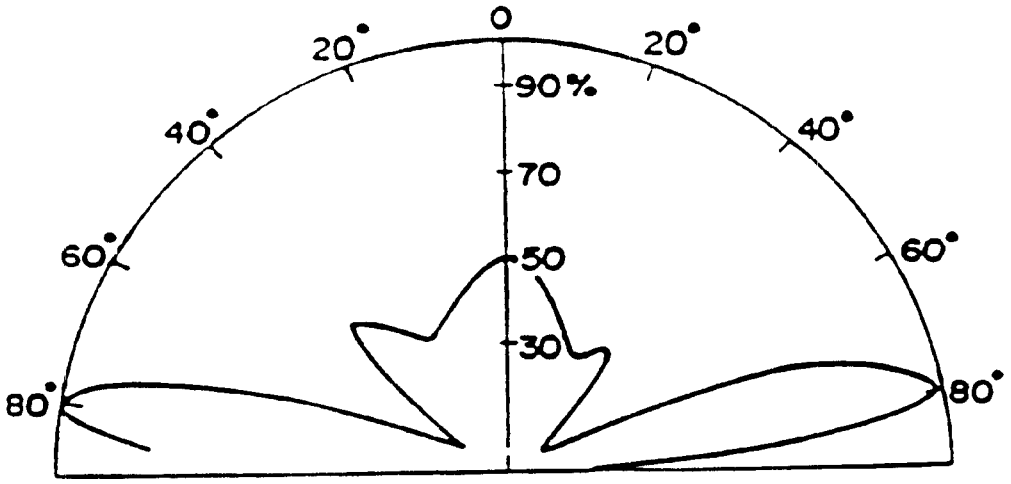
FIGS. 26(a) and 26(b) are diagrams showing angular distributions of light emitted by first elements in the case of the front and reverse types, respectively, wherein triangular pole-shaped lenticular lenses are employed.
Figure 26:
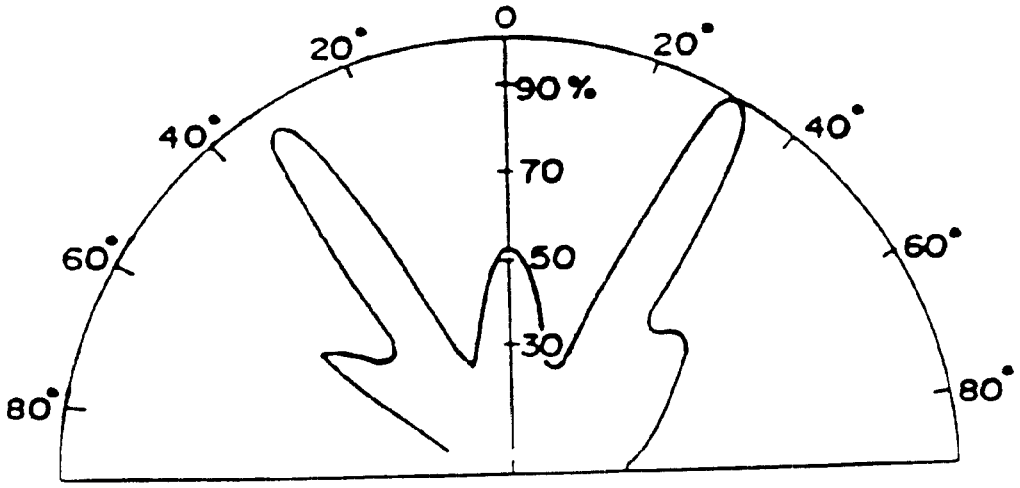

(2) FIG. 26(a) illustrates the angular distribution of light from the first element of the front type in which the triangular pole-shaped lenticular lenses were employed. Meanwhile, the angular distribution of light from the first element of the reverse surface type is illustrated in FIG. 26(b). The maximum luminance value appeared in the direction of 70 to 80 degrees from the normal line in the case of the first element of the front type but in the direction of 30 to 35 degrees from the normal line in the case of the first element of the reverse type.

Figure 27:
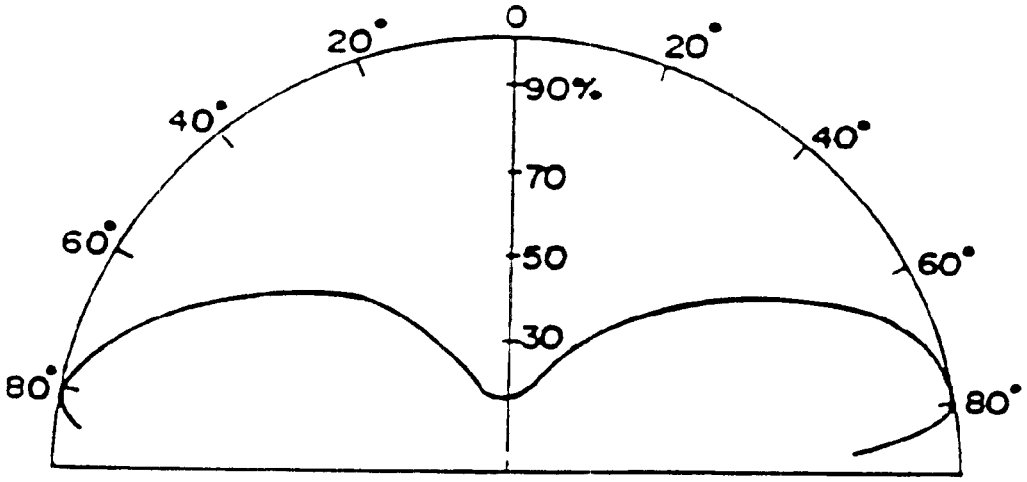
FIGS. 27(a) and 27(b) are diagrams showing angular distributions of light emitted by first elements in the case of the front and reverse types, respectively, wherein concave cylindrical lenticular lenses are employed.
Figure 27:
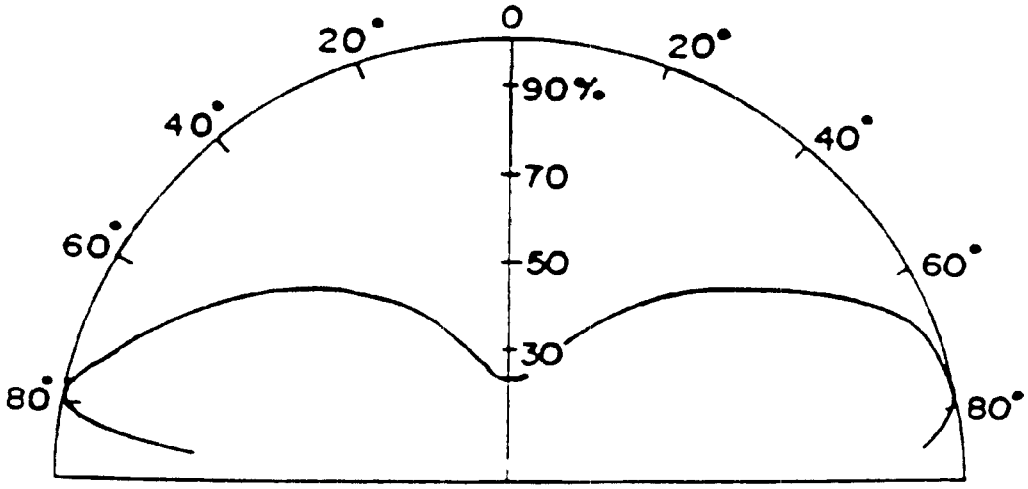

(3) FIG. 27(a) illustrates the angular distribution of light from the first element of the front type in which the concave cylindrical lenticular lenses were employed. Meanwhile, the angular distribution of light from the first element of the reverse type is illustrated in FIG. 27(b). The maximum luminance value appeared in the direction of 75 to 80 degrees from the normal line in the case of the first elements of both of the front and reverse types.

Figure 28:
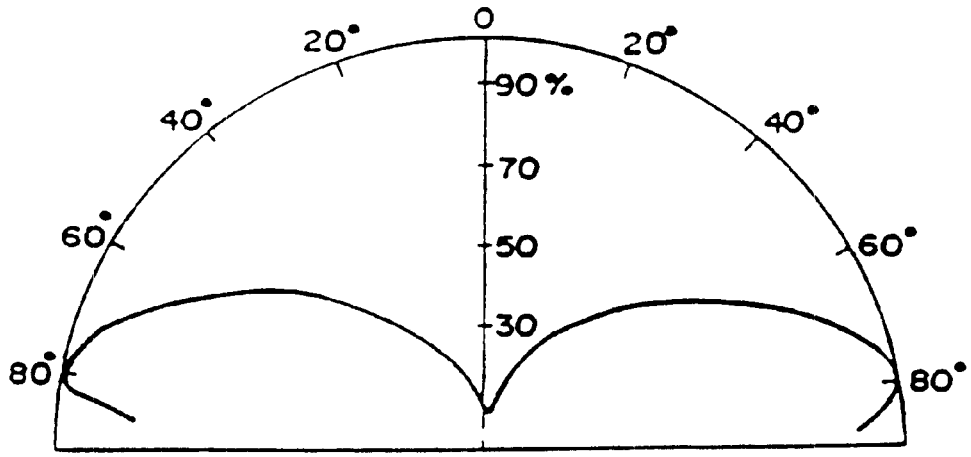
FIGS. 28(a) and 28(b) are diagrams showing angular distributions of light emitted by first elements in the case of the front and reverse types, respectively, wherein polygonal pole-shaped lenticular lenses are employed.
Figure 28:
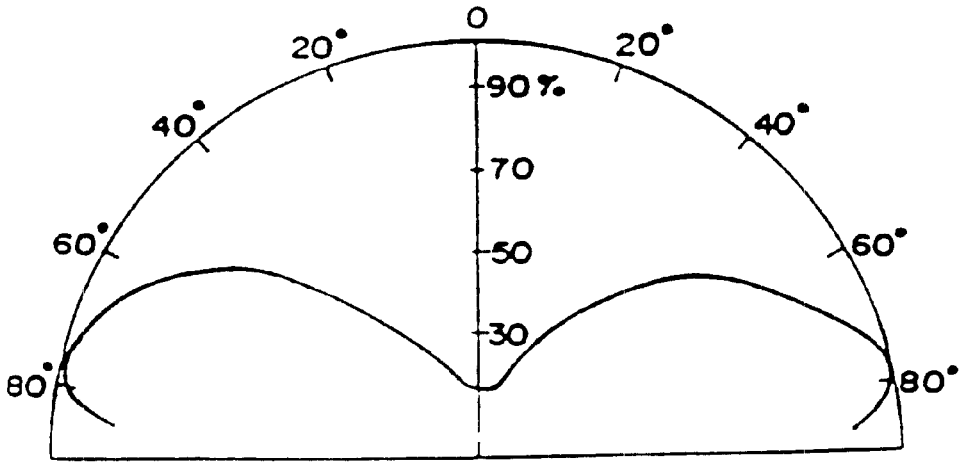

(4) FIG. 28(a) illustrates the angular distribution of light from the first element of the front type in which the convex polygonal pole-shaped lenticular lenses were employed. Meanwhile, the angular distribution of light from the first element of the reverse type is illustrated in FIG. 28(b). The maximum luminance value appeared in the direction of 75 to 80 degrees from the normal line in the case of the first elements of both of the front and reverse types.

Figure 29:
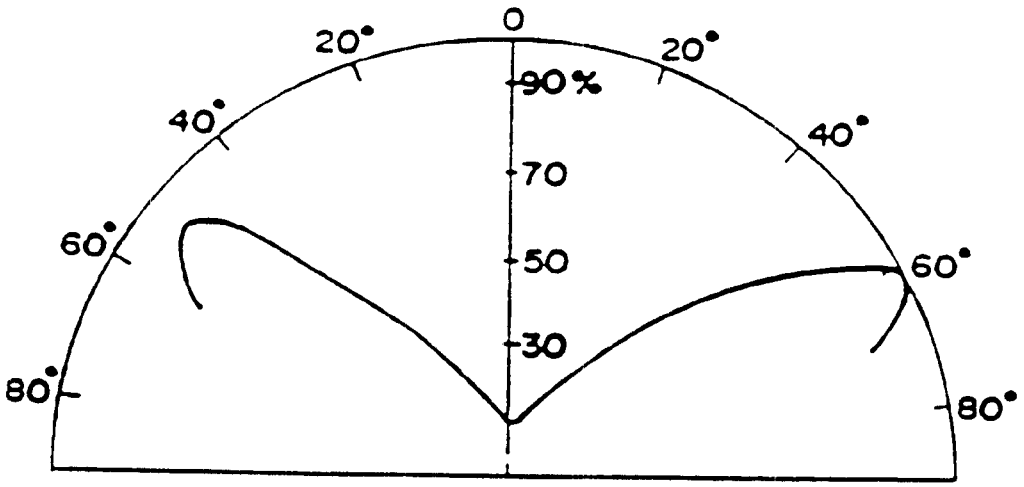
FIGS. 29(a) and 29(b) are diagrams showing angular distributions of light emitted by first elements in the case of the front and reverse types, respectively, wherein different anisotropic lenticular lenses are employed.
Figure 29:
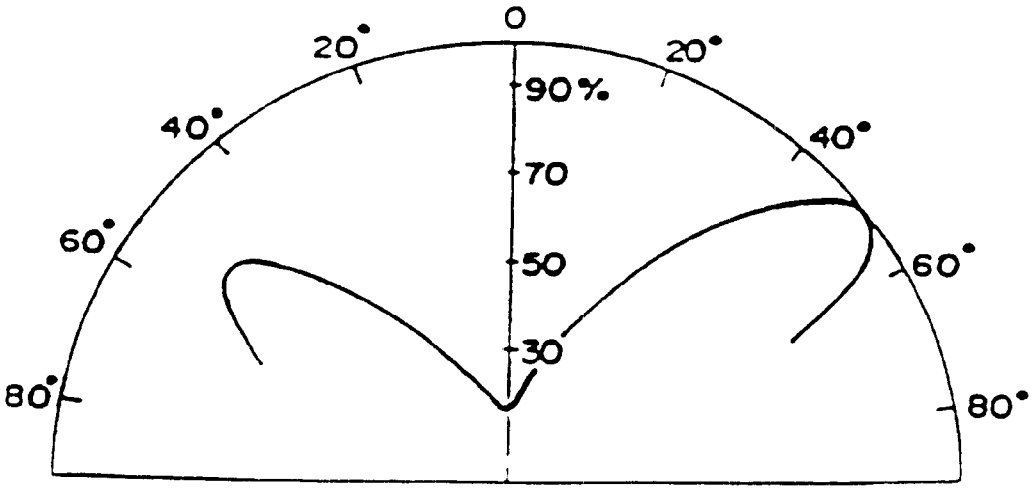

(5) The angular distribution of light from the first element in which the anisotropic lenticular lenses A were employed is illustrated in FIG. 29(a). Meanwhile, the angular distribution of light from the first element in which the anisotropic lenticular lenses B were employed is illustrated in FIG. 29(b). The maximum luminance value appeared in the direction of about 60 degrees from the normal line in the case of the first element in which the anisotropic lenticular lenses A were employed and in the direction of about 50 degrees from the normal line in the case of the first element in which the anisotropic lenticular lenses B were employed.

Production of Plane Light Source Units

The second element described hereinabove (substantially same as that used in the examples 1–1 to 1–3 ) was placed on a surface of each of the first elements produced in such a manner as described above in accordance with the configuration of the latter to produce plane light source units in each of which the lens surface 16 was located on the side of the emitting surface 12 of the first element (i.e., the front type).

Figure 30:
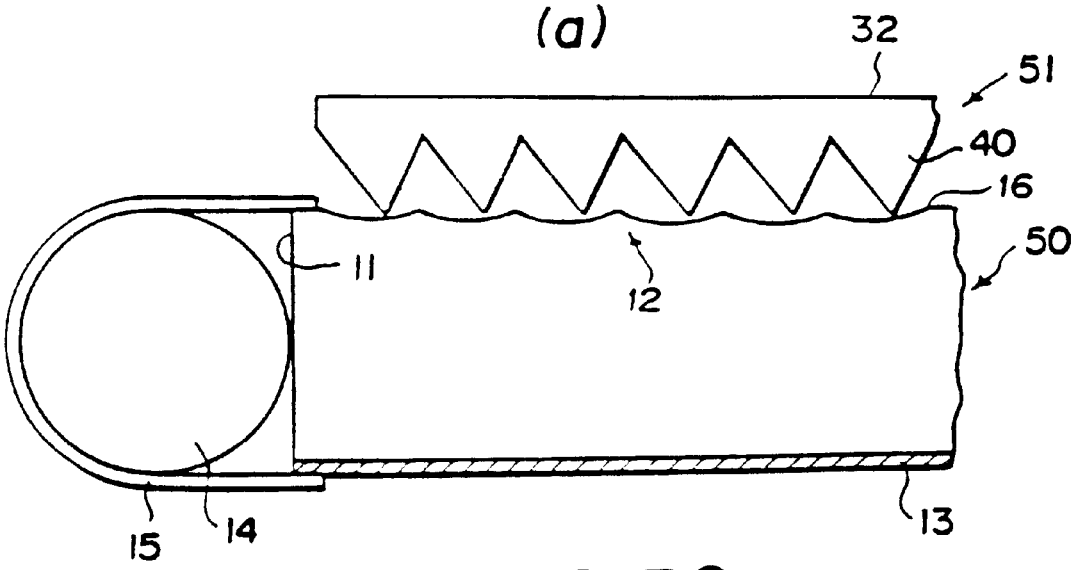
FIGS. 30(a) and 30(b) are schematic sectional views showing different plane light source units of the front and reverse types which employ different concave cylindrical lenticular lenses, respectively, together with lamp.
Figure 30:
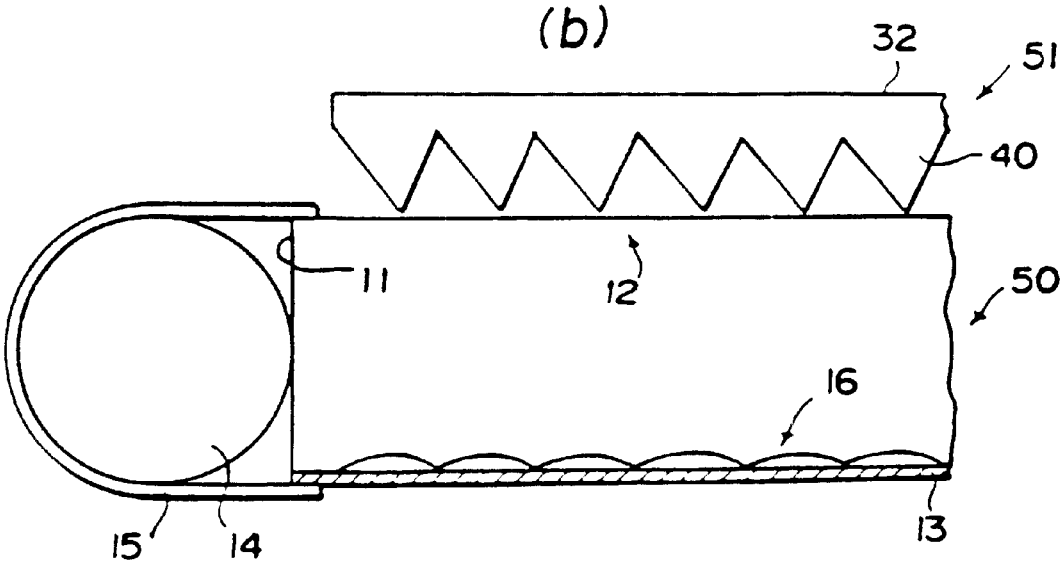

On the other hand, a silver vacuum deposited polyester film was secured on the lens surface of each of the first elements, and the second element described hereinabove (substantially same as that used in the examples 1–1 to 1–3) was placed on the surface opposing to the lens surface of each of the first elements to produce plane light source units of a construction in which the lens surface 16 is located on the opposite side to the emitting surface 12 of the first element (i.e., the reverse type). As examples of such plane light source units, plane light source units of the front and reverse types wherein the concave lenticular lenses were employed are shown in FIGS. 30(a) and 30(b), respectively.

Measurements of Luminance and So on of Individual Plane Light Source Units

Maximum luminance values and angles at which the maximum luminance value was observed as well as half-width of angular distribution were examined for such individual plane light source units described above. The results are listed in Table 6 below. Here, the half-width shows an angular range within which the luminance value is equal to or greater than 50 percent of the maximum luminance value.

TABLE 6

Luminances of Plane Light Source Units in Which Various Light Guides Are Employed

| Lenticular Shape of First Element | | Apex Angle of Second Element | Maximum Luminance | | Half- |
|---|---|---|---|---|---|
| | Type | Prism | Value | Angle | Width |
| Convex Cylindrical | Front | 63° | 3,200 Cd/m$^2$ | 16° | 57° |
| (FIG. 15) | Reverse | 63° | 3,000 Cd/m$^2$ | 17° | 77° |
| Triangular Pole | Front | 66° | 2,350 Cd/m$^2$ | 15° | 75° |
| (FIG. 20) | Reverse | 30° | 2,300 Cd/m$^2$ | 16° | 90° |
| Concave Cylindrical | Front | 63° | 3,100 Cd/m$^2$ | 14° | 60° |
| (FIG. 21) | Reverse | 63° | 2,950 Cd/m$^2$ | 14° | 60° |
| Convex Front Polygonal | | 63° | 3,140 Cd/m$^2$ | 16° | 85° |
| Pole (FIG. 22) | Reverse | 63° | 3,080 Cd/m$^2$ | 14° | 65° |
| Anisotrops | A | 52° | 3,450 Cd/m$^2$ | 16° | 95° |
| (FIG. 23) | B | 52° | 3,800 Cd/m$^2$ | 16° | 55° |

As can be seen from Table 6 above, as for the plane light source units which include the first elements of the convex cylindrical lenticular, triangular pole-shaped lenticular, concave cylindrical lenticular and convex polygonal pole-shaped lenticular lens units, the luminance is a little lower in the case of the reverse type than in the case of the front type, but the difference is very little. Accordingly, they can be satisfactory for practical use whether the first elements are either of the front type or of the reverse type.

Angular Distributions of Light from the Individual Plane Light Source Units

Angular distributions of light from the individual plane light source units as the central point (point of ① of FIG.

5(a)) were measured in accordance with the measurements of angular distributions of light from the first elements described hereinabove.

Figure 31:
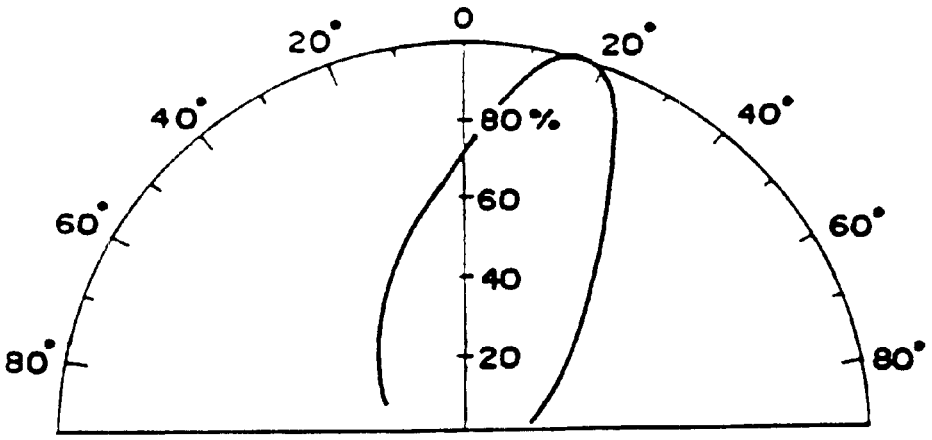
FIGS. 31(a) and 31(b) are diagrams showing angular distributions of light emitted by plane light source units of the front and reverse types which employ convex cylindrical lenticular lenses, respectively.
Figure 31:
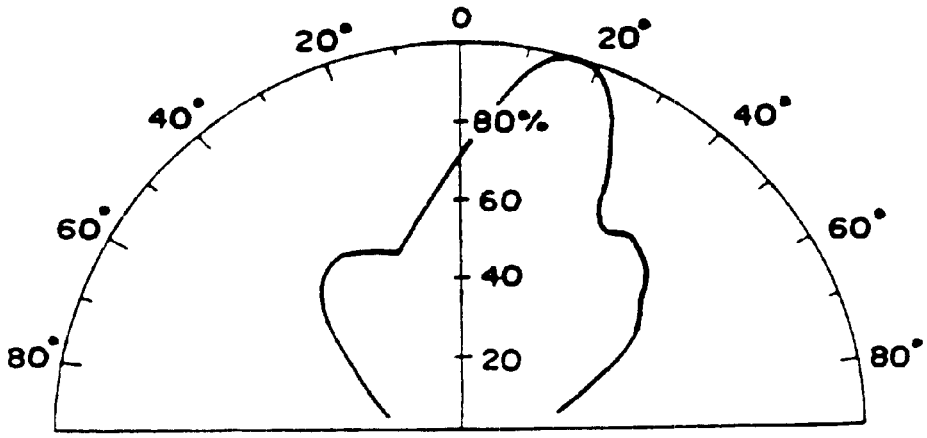

(1) FIG. 31(b) shows the angular distribution of light from the plane light source unit of the reverse type in which the first element having the convex cylindrical lenticular lenses of the configuration shown in FIG. 15 was employed. Meanwhile, the angular distribution of light from the plane light source unit of the front type is shown in FIG. 31(a). In the case of the plane light source unit of the front type, the maximum luminance value appeared in the direction of 15 to 20 degrees and the half-width was about 57 degrees. To the contrary, in the case of the plane light source unit of the reverse type, the maximum luminance value appeared in the direction of 15 to 20 degrees and the half-width was about 77 degrees.

Figure 32:
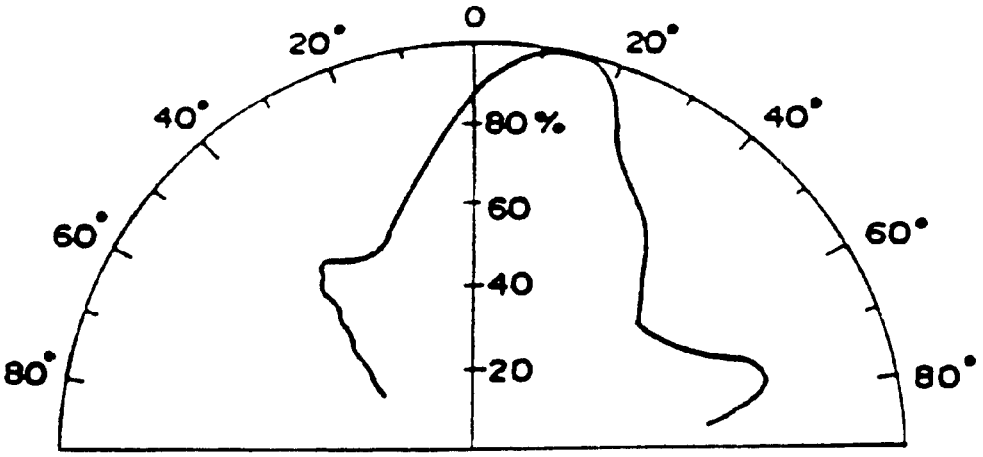
FIGS. 32(a) and 32(b) are diagrams showing angular distributions of light emitted by plane light source units of the front and reverse types which employ triangular pole-shaped lenticular lenses, respectively.
Figure 32:
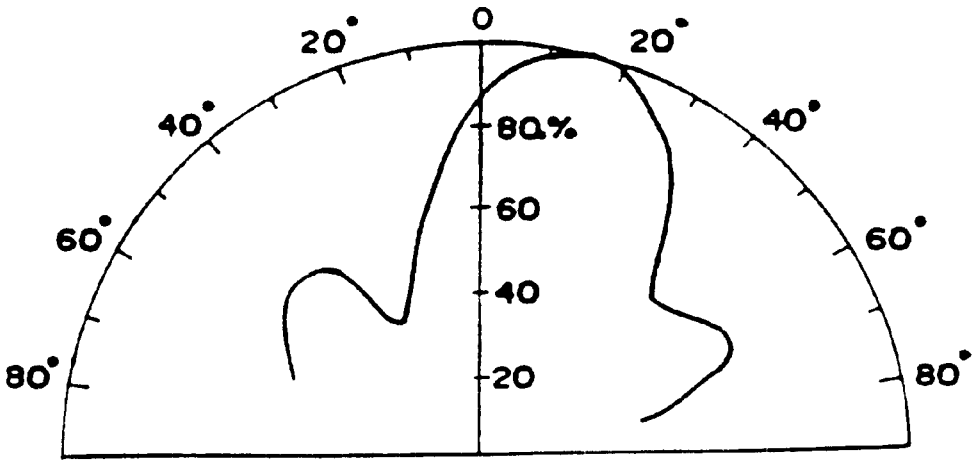

(2) FIG. 32(a) shows the angular distribution of light from the plane light source unit of the front type in which the first element having the triangular pole-shaped lenticular lenses was employed. Meanwhile, the angular distribution of light from the plane light source unit of the reverse type is shown in FIG. 32(b). In the case of the plane light source unit of the front type, the maximum luminance value appeared in the direction of 13 to 15 degrees and the half-width was about 75 degrees. To the contrary, in the case of the plane light source unit of the reverse type, the maximum luminance value appeared in the direction of 15 to 17 degrees and the half-width was about 90 degrees.

Figure 33:
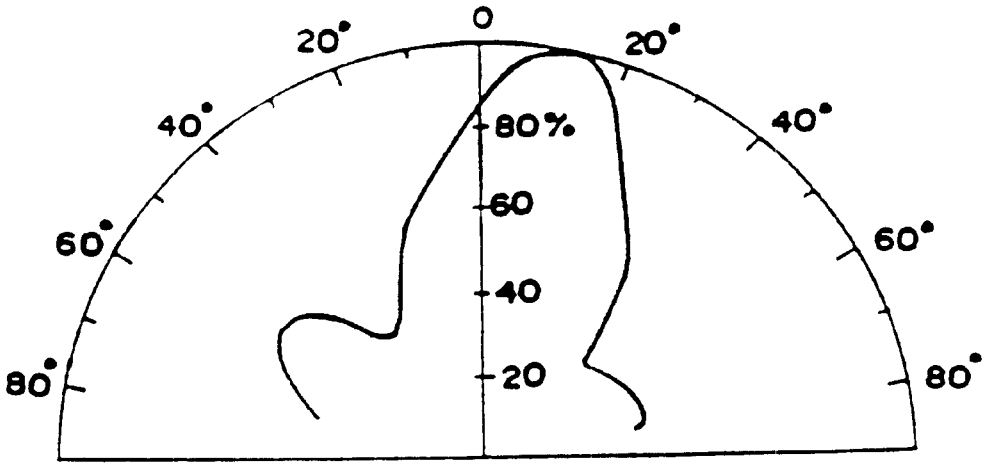
FIGS. 33(a) and 33(b) are diagrams showing angular distributions of light emitted by plane light source units of the front and reverse types which employ concave cylindrical lenticular lenses, respectively.
Figure 33:
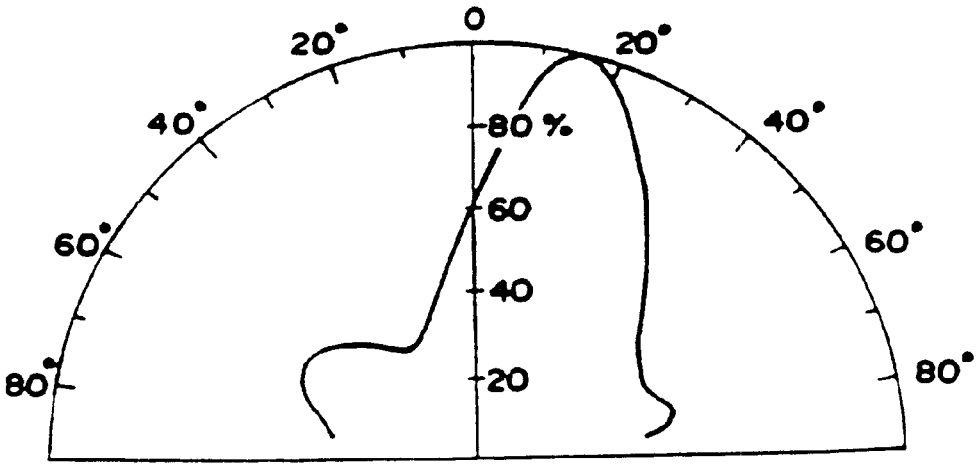

(3) FIG. 3(a) shows the angular distribution of light from the plane light source unit of the front type in which the first element having the concave cylindrical lenticular lenses was employed. Meanwhile, the angular distribution of light from the plane light source unit of the reverse type is shown in FIG. 33(b). In the case of the plane light source unit of the front type, the maximum luminance value appeared in the direction of 13 to 15 degrees and the half-width was about 60 degrees. To the contrary, in the case of the plane light source unit of the reverse type, the maximum luminance value appeared in the direction of 13 to 15 degrees and the half-width was about 60 degrees.

Figure 34:
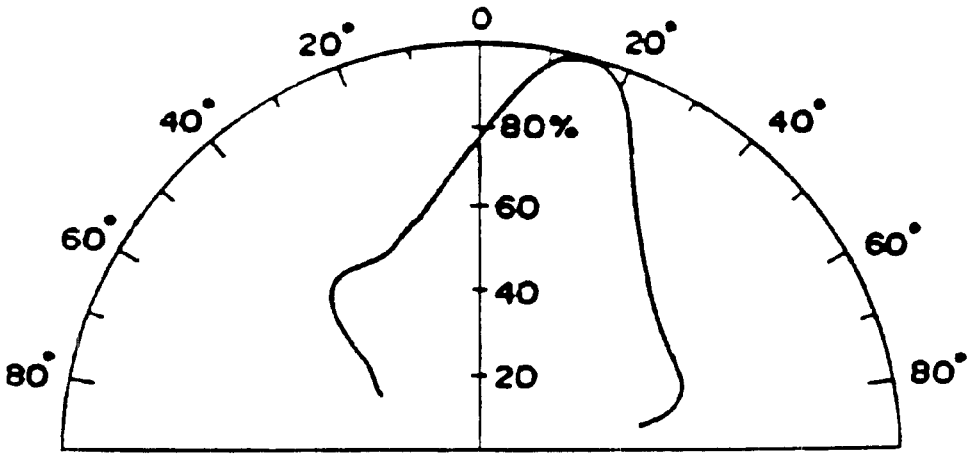
FIGS. 34(a) and 34(b) are diagrams showing angular distributions of light emitted by plane light source units of the front and reverse types which employ polygonal pole-shaped lenticular lenses, respectively.
Figure 34:
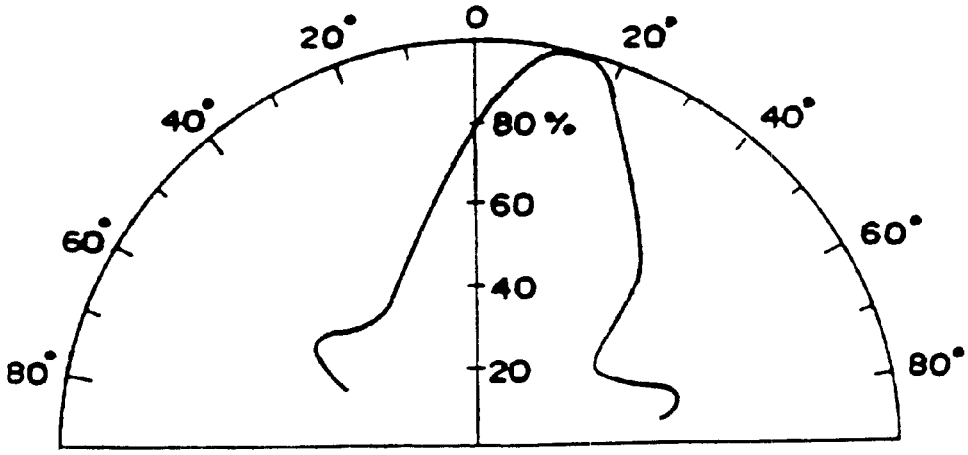

(4) FIG. 34(a) shows the angular distribution of light from the plane light source unit of the front type in which the first element having the convex polygonal pole-shaped lenticular lenses was employed. Meanwhile, the angular distribution of light from the plane light source unit of the reverse type is shown in FIG. 34(b). In the case of the plane light source unit of the front type, the maximum luminance value appeared in the direction of 15 to 17 degrees and the half-width was about 85 degrees. To the contrary, in the case of the plane light source unit of the reverse type, the maximum luminance value appeared in the direction of 13 to 15 degrees and the half-width was about 65 degrees.

Figure 35:
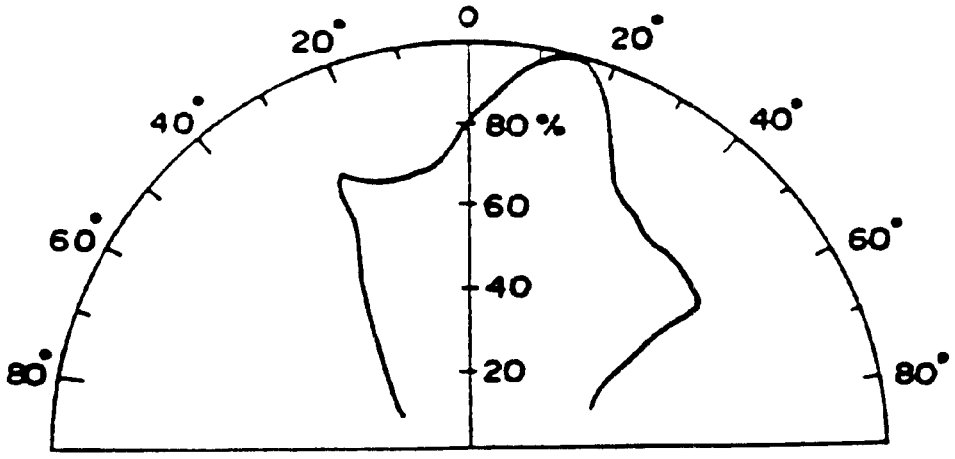
FIGS. 35(a) and 35(b) are diagrams showing angular distributions of light emitted by plane light source units of the front and reverse types which employ different anisotropic lenticular lenses.
Figure 35:
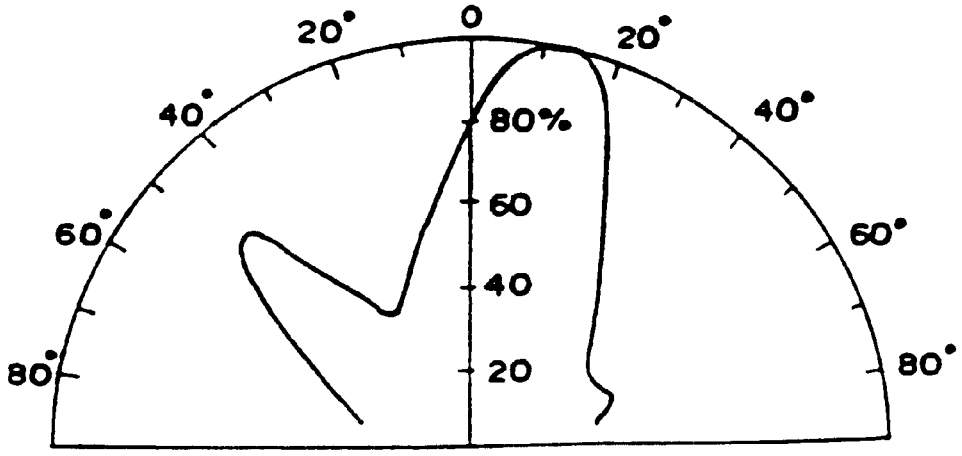

(5) FIG. 35(a) shows the angular distribution of light from the plane light source unit in which the first element having the anisotropic lenticular lenses A was employed. Meanwhile, FIG. 35(b) shows the angular distribution of light from the plane light source unit in which the first element having the anisotropic lenticular lenses B was employed. In the case of the plane light source unit employing the first element having the anisotropic lenticular lenses A, the maximum luminance value appeared in the direction of 15 to 17 degrees and the half-width was about 95 degrees. To the contrary, in the case of the plane light source unit employing the first element having the anisotropic lenticular lenses B, the maximum luminance value appeared in the direction of 13 to 17 degrees and the half-width was about 55 degrees.

Summary

Whether the first element emits the light symmetrically or asymmetrically with respect to the normal line as seen in FIGS. 25(a) to 29(b), the light is emitted by the second element in particular direction as seen in FIGS. 31(a) to 35(b) and Table 6 above and the maximum luminance value is sufficient for practical use, about 2 to 3.5 times that of the cases of non-directional light emission, provided that the second element has an appropriate configuration.

Example 3

Production and Evaluation of Example of Construction Shown in FIG. 12

Production of First Element

At first, a surface of a metal plate was treated by a conventional honing technique wherein glass beads of 60 mesh were blown to one face of a polished brass plate (about 3 mm×250 mm×250 mm) to produce a metal mold having a mat finished surface. Actually, five different kinds of metal molds were produced by varying the treating condition.

Subsequently, using the metal molds, the mat pattern was transferred to one surface of each of acrylic resin plates having a thickness of 5 mm by thermal press work to make a first element.

Production of Second Element

Figure 1:
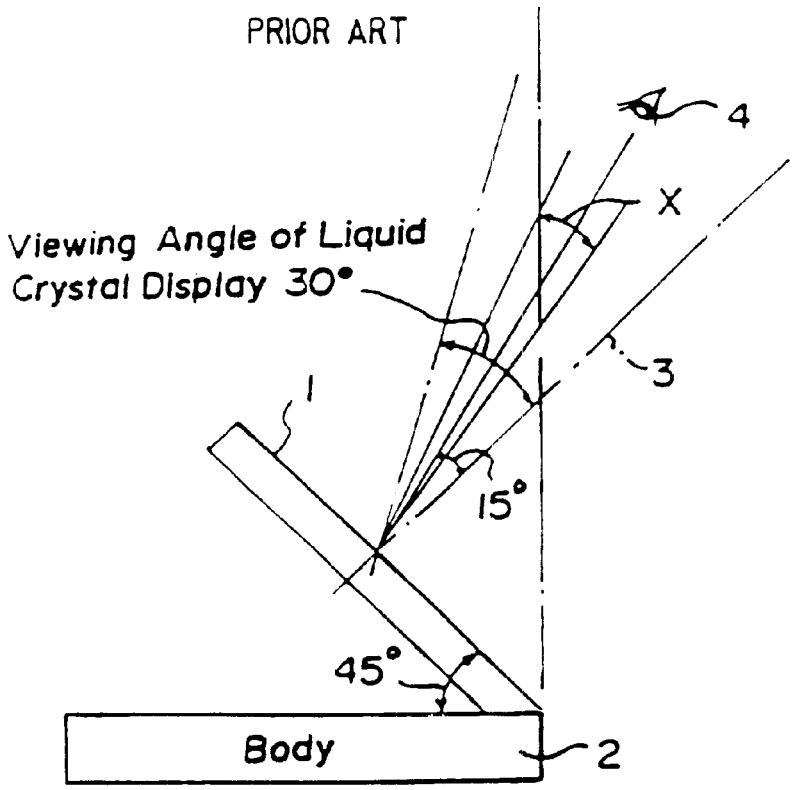
FIG. 1 PRIOR ART
FIG. 1 is a diagrammatic representation illustrating relative angles of a liquid crystal color TV set in an observed condition.

A viewing angle and an inclination angle from the normal line to the picture plane of a portable liquid crystal TV set (refer to FIG. 1) were measured, and the emergent angle was determined so that it might be 15 degrees ($\Psi_{6=\phi 6}$) with respect to the normal line to the picture plane while the prism angles were set to 38 degrees ($=\theta_1$) on the left-hand side and 25 degrees on the right-hand side (=hd θ2) (refer to FIGS. 6(a) and 6(b)). Then, a metal mold having a multi-prism pattern wherein the pitch was 0.38 mm and each of the thus set prisms had an apex angle ($=\theta_1+\theta_2$) of 63 degrees was produced, and using the metal mold, the multi-prism pattern was transferred to an acrylic resin plate having a thickness of 1 mm by thermal press work to make a second element.

Measurements of Haze Values of Light Guide for First Elements (1) Specimens of a 50×50 mm size were cut off from the acrylic resin plate of 5 mm thickness having a mat finished surface produced in the preceding step (1) to obtain samples for measurement of haze values. As comparative samples, a transparent acrylic resin plate was cut similarly into pieces of a 50×50 mm size.

In order to measure haze values of the samples, they were put on a measuring instrument with the mat finished surfaces thereof directed toward the light incidence side in accordance with ASTM-D 1003-61, and the haze values were calculated in accordance with the following expression:

TABLE 7

| Sample | Haze |
|---|---|
| Sample-1 | 70.8% |
| Sample-2 | 64.8 |
| Sample-3 | 40.8 |
| Sample-4 | 28.8 |

TABLE 7-continued

| Sample | Haze |
|---|---|
| Sample-5 | 4.1 |
| Comparative Sample | 0.3 |

(2) Results of the measurements were such as listed in Table 7 below.

TABLE 7

| Sample | Haze |
|---|---|
| Sample-1 | 70.8% |
| Sample-2 | 64.8 |
| Sample-3 | 40.8 |
| Sample-4 | 28.8 |
| Sample-5 | 4.1 |
| Comparative Sample | 0.3 |

Production of and Evaluation of Angular Distributions of Light from First Elements Subsequently, the acrylic resin plates were cut into pieces of 61 mm long×56 mm wide, and the two sides of 61 mm length of each of the pieces were polished by a conventional method while aluminum vacuum deposited polyester films with an adhesive layer were adhered to the other two sides of 56 mm width. Then, a silver vacuum deposited polyester film was secured on a surface opposing to the mat finished surface, and then a fluorescent lamp having a diameter of 7 mm and a length of 245 mm (CB7-245W cold cathode tube by Stanley Electric Co., Ltd.) was arranged on each of the two sides of 61 mm length with aluminum foil applied as a reflector, whereafter the lamp was lit by means of DC 12 V power supply with an invertor. Luminance was measured at the central point (point ① shown in FIG. 9(a)) of the thus obtained first elements at various angles with respect to the normal line by means of a luminance meter (luminance meter nt-1 by Minolta Camera Co., Ltd.) to obtain angular distributions of light (refer to FIG. 9(b)).

The data obtained in this manner are listed in Table 8 below and illustrated in FIGS. 8(a) to 8(d). In FIGS. 8(a) to 8(f), a luminance value is represented in a radial direction and a light emergent angle is represented in a circumferential direction. Data of the sample-5 and the comparative sample are omitted from Table 8 below because the amount of emitted light is too small in any direction to attain accurate measurement.

TABLE 8

| | Maximum Luminance Values in Leftward & Rightward Directions | |
|---|---|---|
| Sample No. | Left | Right |
| Sample-1 | 2,790 | 2,770 cd/m$^2$ |
| Sample-2 | 1,960 | 1,800 |
| Sample-3 | 2,100 | 2,500 |
| Sample-4 | 2,400 | 2,400 |

It is to be noted that the luminance values of lamp surface at the central portion were 5,000 and 5,200 cd/cm$^2$.

Production and Evaluation of Plane Light Source Units According to the Present Invention The aforementioned second element was cut into pieces of 61 mm length and 56 mm width such that the multi-prisms thereof might extend in parallel to the longitudinal edges of the pieces, and the second element pieces were arranged on the first elements such that the prism surfaces thereof might face the first light emitting surfaces of the first elements whereafter they were secured along the sides of the lamps (the sides of 61 mm length) with double-sided adhesive tapes of about 5 mm width to produce plane light source units according to the present invention.

Angular distributions of light from the plane light source units were measured by a quite similar method as the method of evaluation of angular distributions of light from the first elements described hereinabove. Results of the measurements are listed in Table 9 below and illustrated in FIGS. 36(a) to 36(d).

TABLE 9

| Sample No. | Maximum Luminance Value | Angle | Half-Width | Haze of 1st Element |
|---|---|---|---|---|
| Sample-1 | 1,660 cd/m$^2$ | 15° | 45° (−12°, 33°) | 70.8% |
| Sample-2 | 1,450 | 15° | 48° (−15°, 33°) | 64.8 |
| Sample-3 | 1,300 | 15° | 49° (−12°, 37°) | 40.8 |
| Sample-4 | 1,340 | 15° | 42° (−10°, 32°) | 28.8 |

From the results, it can be seen that a sufficient luminance and a sufficient half-width for a plane light source unit can be obtained where the haze value is higher than about 30 percent, preferably higher than 50 percent.

Example 4

Production and Evaluation of Examples of Constructions Shown in FIGS. 13 and 14

Using the metal mold with which the sample-2 of the example 3 described above was produced, the mat pattern was transferred to both surfaces of an acrylic resin plate of 5 mm thickness to make a sample-6. This sample corresponds to the first element 50-2 shown in FIG. 14.

Measurement of Haze Value of Light Guide

A haze value of the sample-6 was measured by a quite same method as in the example 3 described above.

| | Haze |
|---|---|
| Sample-6 | 81.5% |

Production of and Evaluation of Angular Distribution of Light from First Element Using the sample-2 and the sample-6 as light guide, first elements were produced in a quite same manner as in the example 3 described hereinabove, where the sample-2 was used after the silver vacuum deposited polyester film was arranged on the mat finished surface of the same light guide (refer to FIG. 13). The sample of such arrangement will be hereinafter referred to as sample-7. The sample-7 corresponds to the light guide 50-1 shown in FIG. 13. Results of measurements of angular distributions of light are listed in Table 10 below and illustrated in FIGS. 8(e) and 8(f).

TABLE 10

| Sample No. | Maximum Luminance Values in Leftward & Rightward Directions: Left | Right |
|---|---|---|
| Sample-1 | 1,600 cd/m$^2$ | 1,700 cd/m$^2$ |
| Sample-7 | 1,800 | 1,750 |

Luminance values of lamp surface at the central portion were 5,000 and 5,200 cd/m$^2$.

Production and Evaluation of Plane Light Source Units According to the Present Invention Plane light source units were produced, and angular distributions of light from the plane light source units were measured in a quite similar manner as in the example 3 described above.

Figure 36:
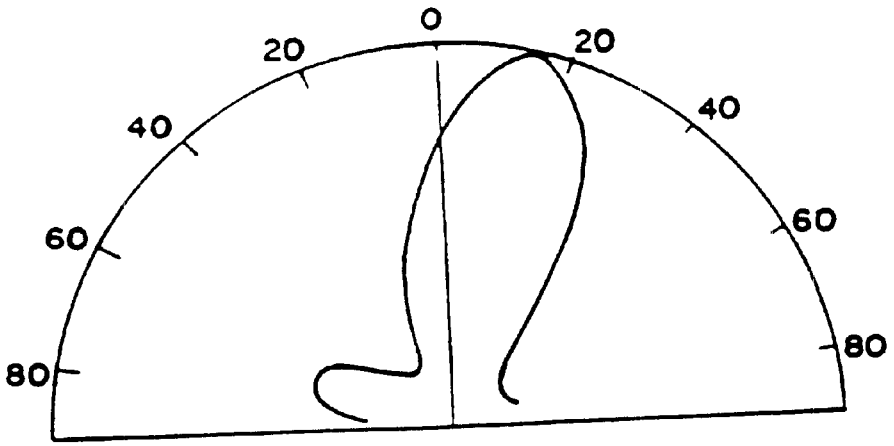
FIGS. 36(a) to 36(f) are diagrams showing angular distributions of light emitted by different surface light source units of the present invention.
Figure 36:
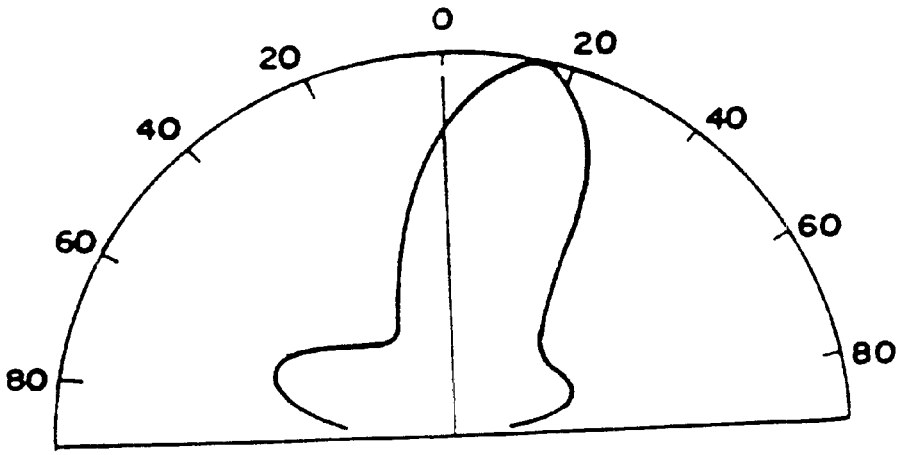
Figure 36:
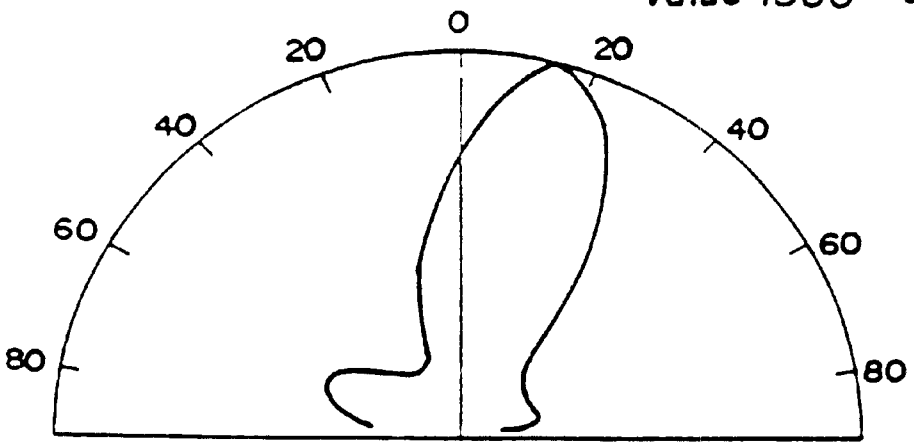
Figure 36:
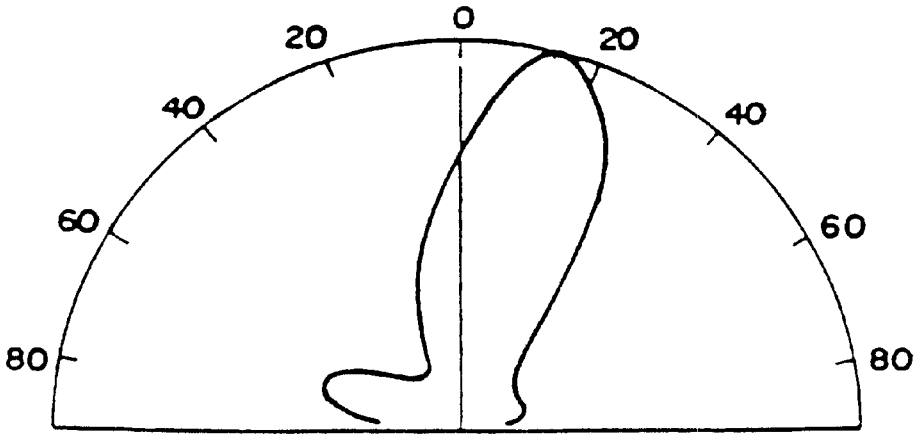
Figure 36:
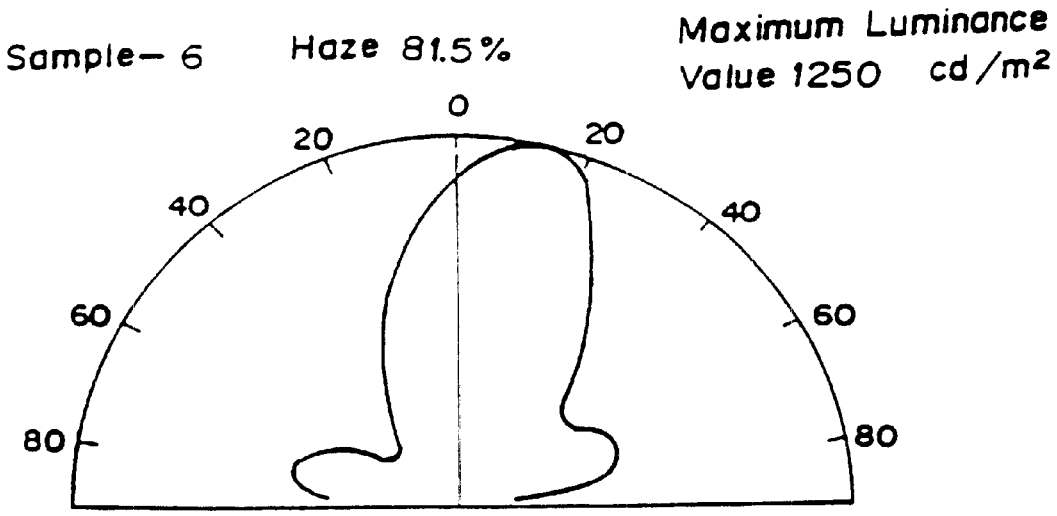
Figure 36:
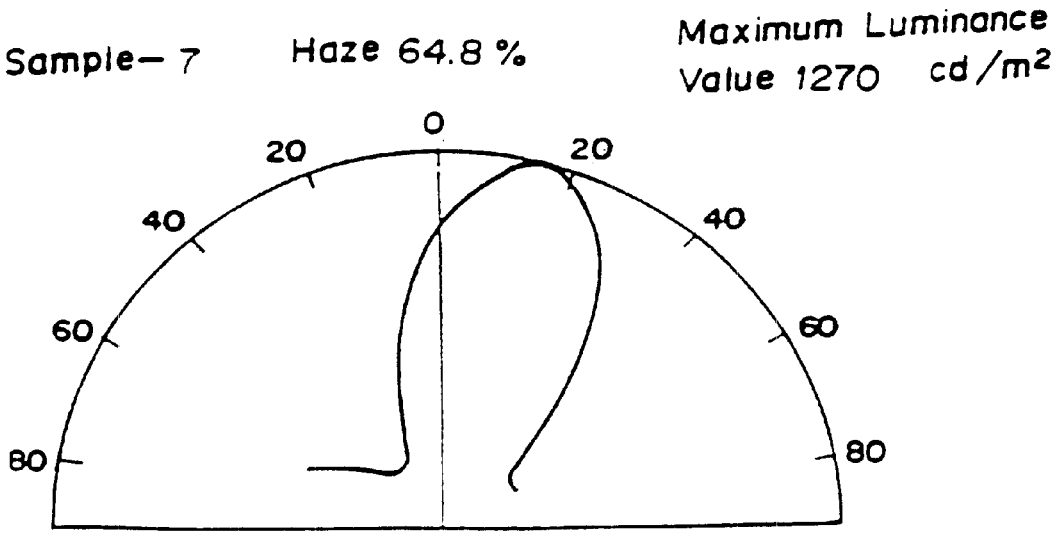

Resultant data are listed in Table 11 below and illustrated in FIGS. 36(e) and 36(f).

TABLE 11

| Sample No. | Maximum Luminance Value | Angle | Half-Width | Haze of Light Guide |
|---|---|---|---|---|
| Sample-6 | 1,250 cd/m$^2$ | 15° | 61° (−23°, 38°) | 81.5% |
| Sample-7 | 1,270 | 15° | 52° (−12°, 40°) | 64.8 |

From the results, it can be seen that the angular distribution of light can become broad where both surfaces of a light guide were mat finished (sample-6) or a surface in contact with a reflecting layer was mat finished (sample-7) (the maximum luminance value is decreased as much).

Comparative Example

Acrylic resin pellet (HIPET HBS [trade mark] by Mitsubishi Rayon Co., Ltd.) was dry-blended with 1.5 percent by weight of rutile type titanium oxide and molded into a film of 50 microns thickness by a conventional extruder. The film was extended on an inorganic flat glass plate so as not to include air bubbles, and after being provisionally secured with methylmethacrylate, a cell was formed with glass plates by means of a spacer in a conventional manner. Methylmethacrylate syrup was poured in the clearance of the cell and polymerized to cure by a conventional manner to polymerize and solidify the film to obtain an acrylic resin plate of 5 mm thickness.

Figure 37:
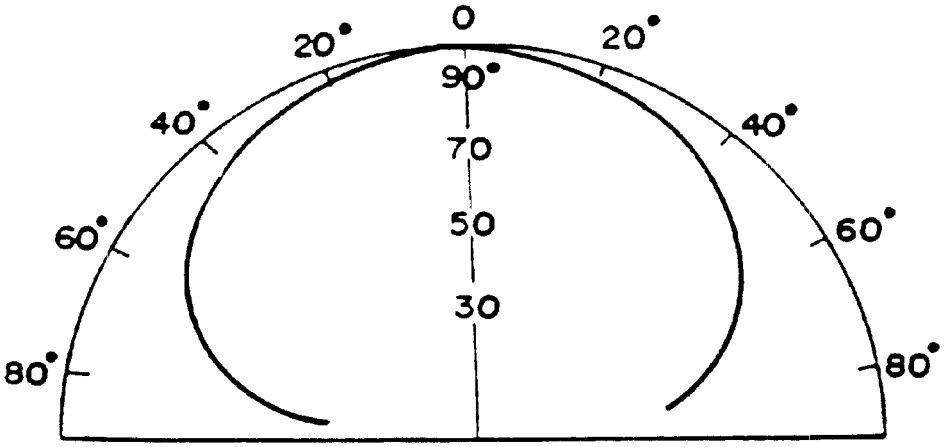
FIG. 37 is a diagram showing an angular distribution of light emitted by a surface light source device of comparative example.

The plate produced in this manner was cut into a size of 61 mm length×56 mm width, and the two sides of 61 mm length were polished in a conventional manner while aluminum vacuum deposited films with an adhesive layer were applied to the other opposite sides of 56 mm width, whereafter a silver vacuum deposited polyester film was arranged on the surface opposite to a white thin layer formed on the surface of the plate. Subsequently, measurements similar to those of the first elements described hereinabove were made by a quite same method to determine angular distributions of light. The resultant data are listed in Table 12 below and illustrated in FIG. 37

TABLE 12

| | Maximum Luminance Value | Angle/Half-Width |
|---|---|---|
| Evaluation | 420 cd/m$^2$ | 0° (normal line direction)/ About 160° (−80°, 80°) |

Summary

As can be seen from comparison between, for example, FIGS. 36(a) to 36(f) and FIG. 37, while the plane light source unit produced in comparative example has a characteristic that light is emitted uniformly in all directions, the plane light source unit of the present invention is advantageous in that light is emitted in particular direction and that the maximum luminance value at the central point is higher, about 3.5 to 4 times, than that obtained in comparative example.

Example 5

As an example wherein the light is emitted to the direction of the normal line to a picture plane, a second element was produced by thermal transfer to an acrylic resin plate of 1 mm thickness by thermal press work using a metal mold of a multi-prism pattern wherein the prism angles were set symmetrically to $\theta_1=\theta_2=31.5$ degrees on the left and right sides and the pitch was set to 0.5 mm.

Figure 38:
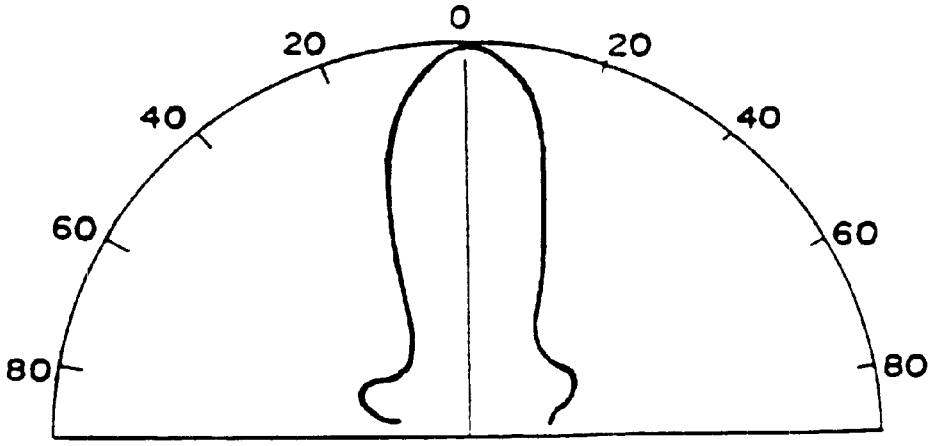
FIG. 38 is a diagram showing an angular distribution of light emitted by a plane light source unit of the $\theta_1=\theta_2$ type according to the present invention.

Using the element of the sample-1 of Table 8 above as a first element, a plane light source unit was produced and an angular distribution of light was measured in a quite similar manner as in the example 3 described hereinabove. Results of measurement of maximum luminance value of the first element are listed in Table 13 below while results of measurement of maximum luminance value of the plane light source unit are listed in Table 14 below, and an angular distribution of light from the plane light source unit is illustrated in FIG. 38.

TABLE 13

| Sample No. | Maximum Luminance Values in Leftward and Rightward Directions (±80°): Left | Right | Haze |
|---|---|---|---|
| Sample-1 | 2,790 | 2.770 cd/m$^2$ | 70.8% |

TABLE 14

| Maximum Luminance Value | Angle | Half-Width | Haze of Light Guide |
|---|---|---|---|
| 1,780 cd/m$^2$ | 0° | 40° (−18°, 22°) | 70.8% |

As can be seen from Table 14 above and FIG. 38, by setting the prism angles $\theta_1$ and $\theta_2$ in such a manner as described hereinabove, the plane light source unit was produced wherein light could be emitted in the normal line direction to the picture plane.

As apparent from the foregoing description, according to the present invention, the following effects are exhibited:

(1) A plane light source unit can be provided wherein light can be emitted readily at a desired direction without increasing the power consumption of a light source and which has a decreased thickness (substantially equal to a diameter of a lamp) and is advantageous for back-lighting means for a display device which has a directivity of viewing angle such as a liquid crystal display device: and (2) Directive light can be obtained readily using a fluorescent lamp which primarily is a source of diffused light, and a desired direction of emitted light can be determined readily similar to focusing of a convex lens.

Having now fully described the invention, it will be apparent to one of ordinary skill in the art that many changes and modifications can be made thereto without departing from the spirit and scope of the invention as set forth herein.

We claim:

[1. A plane light source unit, comprising a first element having a light incident face at lest at one side end thereof and a first light emitting surface extending perpendicularly to said light incident face, such first element further having a reflecting layer provided on a surface thereof opposite to said first light emitting surface, and a second element having a light incident surface which receives the light emitted by said first element and a second light emitting surface through which light is emitted in a predetermined direction, at least one of said first light emitting surface and the opposite surface of said first element comprising means having a directive function to cause incident light through said light incident face to emit through said first light emitting surface in two preferential directions oblique to, and on opposite sides of, a normal line thereof, said second element having a large number of prism units formed on said light incident surface thereof, each prism unit having at least one surface positioned for effecting total reflection of the light received by said second element, wherein the direction of substantially all of the light emitting from said second element makes an angle ranging from 0 degrees to 20 degrees with respect to a normal line of said first light emitting surface of said first element.]

[2. A plane light source unit according to claim 1, wherein either said first light emitting surface or the opposite surface of said first element has a large number of lens units formed thereon which contribute to the directive function.]

[3. A plane light source unit according to claim 2, wherein said large number of lens units are convex cylindrical lenticular lenses.]

[4. A plane light source unit according to claim 2, wherein said large number of lens units are concave cylindrical lenticular lenses.]

[5. A plane light source unit according to claim 2, wherein said large number of lens units are triangular pole-shaped lenticular lenses.]

[6. A plane light source unit according to claim 2, wherein said large number of lens units are polygonal pole-shaped lenticular lenses.]

[7. A plane light source unit according to claim 2, wherein said large number of lens units are anisotropic lenticular lenses.]

[8. A plane light source unit according to claim 1, wherein said first light emitting surface and/or the opposite surface of said first element has a mat finished surface which extends substantially in parallel to a plane of said reflecting layer and contribute to the directive function.]

[9. A plane light source unit according to claim 8, wherein a haze of said first element on which said mat finished surface is formed is equal to or greater than 30 percent.]

[10. A plane light source unit according to claim 1, wherein said first element has a pair of light incident surfaces at two opposing side ends thereof.]

[11. A plane light source unit according to claim 1, wherein said first element is made of an acrylic resin material.]

[12. A plane light source unit according to claim 1, wherein said first element is made of a polycarbonate resin material.]

[13. A plane light source unit according to claim 1, wherein said second element is made of an acrylic resin material.]

[14. A plane light source unit according to claim 1, wherein said second element is made of a polycarbonate resin material.]

[15. A plane light source unit according to claim 1, wherein the direction of light emitting from said first element makes an angle equal to or greater than 45 degrees and smaller than 90 degrees with respect to a normal line of said first light emitting surface of said first element.]

*16. A plane light source unit comprising:*

*a first element having a light incident face at least at one side end thereof, a first light emitting surface extending perpendicularly to said light incident face, and an opposite surface opposite to said first light emitting surface,*

*at least one of the first light emitting surface and the opposite surface comprising means having a directive function to cause incident light through the light incident face to emit through the first light emitting surface in a direction oblique to a line normal to the first light emitting surface;*

*a reflecting layer provided adjacent the opposite surface of said first element,*

*a second element having a large number of prism units, each prism unit having at least one surface for effecting total reflection of the light received by the second element, said second element including a light incident surface and a second light emitting surface through which light is emitted in a predetermined direction, wherein the direction of substantially all light emitting from said second element makes an angle ranging from 0 degrees to 50 degrees with respect to the line normal to the first light emitting surface of said first element.*

*17. A plane light source unit according to claim 16, wherein said means having a directive function is distributed over the first light emitting surface.*

*18. A plane light source unit according to claim 16, wherein one of the light incident surface and the second light emitting surface includes said large number of prism units and the other of the light incident surface and the second light emitting surface is flat.*

*19. A plane light source unit according to claim 16, wherein at least one of the light incident surface and the second light emitting surface includes said large number of prism units.*

*20. A plane light source unit according to claim 16, wherein the direction of substantially all light emitting from said second element makes an angle ranging from 0 degrees to 40 degrees with respect to the line normal to the first light emitting surface of said first element.*

*21. A plane light source unit according to claim 20, wherein said means having a directive function is distributed over the first light emitting surface.*

*22. A plane light source unit according to claim 20, wherein one of the light incident surface and the second light emitting surface includes said large number of prism units and the other of the light incident surface and the second light emitting surface is flat.*

*23. A plane light source unit according to claim 20, wherein at least one of the light incident surface and the second light emitting surface includes said large number of prism units.*

*24. A plane light source unit according to claim 16, wherein the direction of substantially all light emitting from*

*said second element makes an angle ranging from 0 degrees to 30 degrees with respect to the line normal to the first light emitting surface of said first element.*

*25. A plane light source unit according to claim 24, wherein said means having a directive function is distributed over the first light emitting surface.*

*26. A plane light source unit according to claim 24, wherein one of the light incident surface and the second light emitting surface includes said large number of prism units and the other of the light incident surface and the second light emitting surface is flat.*

*27. A plane light source according to claim 24, wherein at least one of the light incident surface and the second light emitting surface includes said large number of prism units.*

*28. A plane light source unit according to claim 16, wherein the direction of substantially all light emitting from said second element makes an angle ranging from 0 degrees to 20 degrees with respect to the line normal to the first light emitting surface of said first element.*

*29. A plane light source unit according to claim 28, wherein said means having a directive function is distributed over the first light emitting surface.*

*30. A plane light source unit according to claim 28, wherein one of the light incident surface and the second light emitting surface includes said large number of prism units and the other of the light incident surface and the second light emitting surface is flat.*

*31. A plane light source unit according to claim 28, wherein at least one of the light incident surface and the second light emitting surface includes said large number of prism units.*

*32. A plane light source unit according to claim 16, wherein said prism units are triangular prism units.*

*33. A plane light source unit according to claim 32, wherein said triangular prism units are isosceles triangular prism units.*

*34. A plane light source unit comprising:*

*a first element having a light incident face at least at one side end thereof, a first light emitting surface extending perpendicularly to said light incident face, and an opposite surface opposite to said first light emitting surface,*

*at least one of the first light emitting surface and the opposite surface comprising means having a directive function to cause incident light through the light incident face to emit through the first light emitting surface in a direction oblique to a line normal to the first light emitting surface;*

*a reflecting layer provided adjacent the opposite surface of said first element,*

*a second element having a large number of prism units, each prism unit having at least one surface for effecting total reflection of the light received by the second element, said second element including a light incident surface and a second light emitting surface through which light is emitted in a predetermined direction, wherein an angle at which the maximum luminance value is observed is from 0 degrees to 20 degrees with respect to the line normal to the first light emitting surface of said first element.*

*35. A plane light source unit according to claim 34, wherein said means having a directive function is distributed over the first light emitting surface.*

*36. A plane light source unit according to claim 34, wherein one of the light incident surface and the second light emitting surface includes said large number of prism units and the other of the light incident surface and the second light emitting surface is flat.*

*37. A plane light source unit according to claim 34, wherein at least one of the light incident surface and the second light emitting surface includes said large number of prism units.*

*38. A plane light source unit according to claim 34, wherein said prism units are triangular prism units.*

*39. A plane light source unit according to claim 38, wherein said triangular prism units are isosceles triangular prism units.*

*40. A plane light source unit comprising:*

*a first element having a light incident face at least at one side end thereof, a first light emitting surface extending perpendicularly to said light incident face, and an opposite surface opposite to said first light emitting surface,*

*at least one of the first light emitting surface and the opposite surface comprising means having a directive function to cause incident light through the light incident face to emit through the first light emitting surface in a direction oblique to a line normal to the first light emitting surface;*

*a reflecting layer provided adjacent the opposite surface of first element,*

*a second element having a large number of substantially triangular prism units, each prism unit having at least one surface for effecting total reflection of the light received by the second element, said second element including a light incident surface and a second light emitting surface through which light is emitted in a predetermined direction.*

*41. A plane light source unit according to claim 40, wherein said means having a directive function is distributed over the first light emitting surface.*

*42. A plane light source unit according to claim 40, wherein one of the light incident surface and the second light emitting surface includes said large number of prism units and the other of the light incident surface and the second light emitting surface is flat.*

*43. A plane light source unit according to claim 40, wherein at least one of the light incident surface and the second light emitting surface includes said large number of prism units.*

*44. A plane light source unit according to any one of claims 41–43, wherein said triangular prism units are isosceles prism units.*

*45. A plane light source unit according to any one of claims 16–31, 34–43, wherein said second element comprises an acrylic resin material.*

*46. A plane light source unit according to any one of claims 16–31, 34–43, wherein said second element comprises a polycarbonate resin material.*

*47. A plane light source according to any one of claims 16–31, 34–43, wherein the light incident surface of said second element includes said large number of prism units.*

*48. A plane light source unit according to any one of claims 16–31, 34–43, wherein the first light emitting surface of said first element has one of a roughened surface, a plurality of convex lenses, and a plurality of concave lenses.*

*49. A plane light source unit according to any one of claims 16–31, 34–43, wherein the opposite surface of said first element has one of a roughened surface, a plurality of convex lenses, and a plurality of concave lenses.*

*50. A plane light source unit according to any one of claims 16–31, 34–43, wherein the first light emitting surface of said first element is flat.*

*51. A plane light source unit according to any one of claims 16–31, 34–43, wherein the opposite surface of said first element is flat.*

*52. A plane light source unit according to any one of claims 16–31, 34–43, wherein said second element is disposed directly on the first light emitting surface of said first element.*

*53. A plane light source unit according to any one of claims 16–31, 34–43, wherein said reflecting layer is disposed directly on the opposite surface of said first element.*

*54. A plane light source unit according to any one of claims 16–31, 34–43, wherein said first element is a plate having a uniform thickness.*

*55. A backlighting arrangement for a liquid crystal display device comprising:*

*a light guide having a light incident face at least at one side end thereof and a light emitting surface extending substantially perpendicularly to said light incident face;*

*a lamp disposed adjacent to said light incident face of said light guide, said lamp generating light for illuminating the liquid crystal display device;*

*a reflecting layer disposed adjacent a surface of said light guide opposite the light emitting surface;*

*a prismatic element disposed over the light emitting surface of said light guide, said prismatic element having a first surface and a second surface opposite the first surface, at least one of the first surface and the second surface having a large number of prism units formed thereon, each prism unit having at least one surface for effecting total reflection of the light received by said prismatic element; and*

*a light directive pattern between said reflecting layer and said prismatic element, the light directive pattern causing light entering said light guide through the light incident face to emit from the light emitting surface of said light guide in a direction oblique to a line normal to the light emitting surface,*

*wherein the direction of substantially all light emitting from said prismatic element makes an angle ranging from 0 degrees to 50 degrees with respect to the line normal to the light emitting surface of said light guide.*

*56. A backlighting arrangement for a liquid crystal display device according to claim 55, wherein the direction of substantially all light emitting from said second element makes an angle ranging from 0 degrees to 40 degrees with respect to the line normal to the first light emitting surface of said first element.*

*57. A backlighting arrangement for a liquid crystal display device according to claim 55, wherein the direction of substantially all light emitting from said second element makes an angle ranging from 0 degrees to 30 degrees with respect to the line normal to the first light emitting surface of said first element.*

*58. A backlighting arrangement for a liquid crystal display device according to claim 55, wherein the direction of substantially all light emitting from said second element makes an angle ranging from 0 degrees to 20 degrees with respect to the line normal to the first light emitting surface to said first element.*

*59. A backlighting arrangement for a liquid crystal display device comprising:*

*a light guide having a light incident face at least at one side end thereof and a light emitting surface extending substantially perpendicularly to said light incident face;*

*a lamp disposed adjacent to said light incident face of said light guide, said lamp generating light for illuminating the liquid crystal display device;*

*a reflecting layer disposed adjacent a surface of said light guide opposite the light emitting surface;*

*a prismatic element disposed over the light emitting surface of said light guide, said prismatic element having a first surface and a second surface opposite the first surface, at least one of the first surface and the second surface having a large number of prism units formed thereon, each prism unit having at least one surface for effecting total reflection of the light received by said prismatic element; and*

*a light directive pattern between said reflecting layer and said prismatic element, the light directive pattern causing light entering said light guide through the light incident face to emit from the light emitting surface of said light guide in a direction oblique to a line normal to the light emitting surface,*

*wherein an angle at which the maximum luminance value is observed is from 0 degrees to 20 degrees with respect to the line normal to the light emitting surface of said light guide.*

*60. A backlighting arrangement for a liquid crystal display device according to any one of claims 55–59, wherein said light directive pattern is formed on the light emitting surface of said light guide.*

*61. A backlighting arrangement for a liquid crystal display device according to any one of claims 55–59, wherein said light guide and said light directive pattern are formed by a single structural element.*

*62. A backlighting arrangement for a liquid crystal display device according to any one of claims 55–59, wherein said second surface of said prismatic element faces said light emitting surface of said light guide.*

*63. A backlighting arrangement for a liquid crystal display device according to any one of claims 55–59, wherein said prismatic element is disposed directly on said light emitting surface of said light guide.*

*64. A backlighting arrangement for a liquid crystal display device according to any one of claims 55–59, wherein said reflecting layer is disposed directly on said surface opposite to said light emitting surface of said light guide.*

*65. A backlighting arrangement for a liquid crystal display device according to any one of claims 55–59, wherein said light guide is a plate having a uniform thickness.*

*66. A backlighting arrangement for a liquid crystal display device according to any one of claims 55–59, wherein said light directive pattern comprises one of a plurality of convex lenses, a plurality of concave lenses, and a roughened finish formed on the light emitting surface of said light guide.*

*67. A backlighting arrangement for a liquid crystal display device according to any one of claims 55–59, wherein said light directive pattern comprises one of a plurality of convex lenses, a plurality of concave lenses, and a roughened finish formed on the surface opposite the light emitting surface of said light guide.*

*68. A backlighting arrangement for a liquid crystal display device according to any one of claims 55–59, wherein said prism units are triangular prisms.*

*69. A backlighting arrangement for a liquid crystal display device according to claim 68, wherein said triangular prisms are isosceles.*

*70. A backlighting arrangement for a liquid crystal display device according to any one of claims 55–59, wherein said prismatic element comprises an acrylic resin material.*

*71. A backlighting arrangement for a liquid crystal display device according to any one of claims 55–59, wherein said prismatic element comprises a polycarbonate resin material.*

*72. A backlighting arrangement for a liquid crystal display device according to any one of claims 55–59, wherein said light emitting surface is flat.*

*73. A backlighting arrangement for a liquid crystal display device according to any one of claims 55–59, wherein said surface opposite to said light emitting surface is flat.*

* * * * *